United States Patent
Teles et al.

(10) Patent No.: US 9,174,192 B2
(45) Date of Patent: Nov. 3, 2015

(54) TUBE BUNDLE REACTOR FOR UNCATALYZED OR HOMOGENEOUSLY CATALYZED REACTIONS

(75) Inventors: Joaquim Henrique Teles, Waldsee (DE); Peter Resch, Hettenleidelheim (DE); Wilhelm Ruppel, Mannheim (DE); Ulrike Wegerle, Worms (DE); Wolfgang Gerlinger, Germany (DE); Beatrice Rößler-Feigel, Weisenheim am Sand (DE); Anton Meier, Birkenheide (DE); Christian Müller, Mannheim (DE)

(73) Assignee: BASF SE, Ludwigshafen (DE)

( * ) Notice: Subject to any disclaimer, the term of this patent is extended or adjusted under 35 U.S.C. 154(b) by 1139 days.

(21) Appl. No.: 13/380,207

(22) PCT Filed: Jan. 19, 2010

(86) PCT No.: PCT/EP2010/000280
§ 371 (c)(1),
(2), (4) Date: Mar. 9, 2012

(87) PCT Pub. No.: WO2010/083978
PCT Pub. Date: Jul. 29, 2010

(65) Prior Publication Data
US 2012/0157719 A1    Jun. 21, 2012

(30) Foreign Application Priority Data
Jan. 21, 2009   (EP) .................... 09151002

(51) Int. Cl.
*B01J 19/24* (2006.01)
*B01J 19/00* (2006.01)
*B01J 4/00* (2006.01)
*F28D 7/16* (2006.01)
*F28F 9/02* (2006.01)

(52) U.S. Cl.
CPC ............. *B01J 19/2425* (2013.01); *B01J 4/001* (2013.01); *B01J 19/006* (2013.01); *B01J 2219/00085* (2013.01); *B01J 2219/00166* (2013.01); *F28D 7/16* (2013.01); *F28F 9/0265* (2013.01); *F28F 9/0275* (2013.01); *F28F 9/0278* (2013.01)

(58) Field of Classification Search
CPC ........................................................ B01J 19/24
USPC .................................. 422/129, 201; 568/365
See application file for complete search history.

(56) References Cited

U.S. PATENT DOCUMENTS

| | | | |
|---|---|---|---|
| 4,221,763 A | 9/1980 | Greene | |
| 4,635,712 A * | 1/1987 | Baker et al. | 165/82 |
| 7,988,927 B2 | 8/2011 | Lehr et al. | |
| 2003/0175183 A1 | 9/2003 | Guetlhuber | |
| 2005/0262850 A1 | 12/2005 | Knight et al. | |
| 2006/0133972 A1 | 6/2006 | Guetlhuber et al. | |
| 2006/0266504 A1 * | 11/2006 | Rohrbaugh et al. | 165/158 |
| 2008/0299017 A1 * | 12/2008 | Sattler et al. | 422/186.3 |
| 2009/0220391 A1 | 9/2009 | Gerlinger et al. | |
| 2011/0171101 A1 | 7/2011 | Schaefer et al. | |
| 2012/0157719 A1 | 6/2012 | Teles et al. | |

FOREIGN PATENT DOCUMENTS

| | | |
|---|---|---|
| CN | 1738676 A | 2/2006 |
| DE | 1 601 162 A1 | 10/1970 |
| DE | 202 19 277 U1 | 2/2003 |
| DE | 202 19 278 U1 | 2/2003 |
| DE | 202 19 279 U1 | 2/2003 |
| DE | 10 2004 018 267 A1 | 11/2005 |
| DE | 10 2005 001952 A1 | 7/2006 |
| DE | 10 2005 061626 A1 | 6/2007 |
| EP | 1 080 780 A1 | 3/2001 |
| EP | 1 080 781 A1 | 3/2001 |
| EP | 1 882 518 A2 | 1/2008 |
| JP | 2004515332 A | 5/2004 |
| JP | 2006192430 A | 7/2006 |
| JP | 2008529779 A | 8/2008 |
| WO | WO-2006/087353 A1 | 8/2006 |
| WO | WO-2007/045574 A1 | 4/2007 |
| WO | WO-2009/013035 A1 | 1/2009 |
| WO | WO-2010083978 A2 | 7/2010 |

OTHER PUBLICATIONS

Walas, S. M., "Types and Examples of Reactors", Chemical Process Equipment, Selection and Design, (1988), p. 569.
Berty, J. M., Applied Industrial Catalysis, vol. 1, Academic Press, (1983), pp. 50-51, 250-253, 264-265.

* cited by examiner

*Primary Examiner* — Walter D Griffin
*Assistant Examiner* — Huy-Tram Nguyen
(74) *Attorney, Agent, or Firm* — Drinker Biddle & Reath LLP

(57) ABSTRACT

The invention relates to a tube bundle reactor with a flat feed hood. Alternatively, the release hood may also have a flat design. The flat design reduces the heat of reaction which arises in the hood in the case of reaction types which take place not only in the tube bundle (uncatalyzed reactions and reactions with homogeneously distributed catalyst). This greatly suppresses undesired reactions which already take place in the hood owing to accumulated heat, which achieves a higher selectivity in the case of thermally sensitive reactions. In addition, the thermal distribution within the hoods can be controlled precisely.

The tube bundle reactor comprises a tube bundle which has a feed end which is connected to a feed hood of the tube bundle reactor, wherein the feed hood is configured in a flat design with a cross-sectional area at the feed end and an internal volume, and the ratio of internal volume to cross-sectional area is less than 0.35 m. The invention is further implemented by means of a process for operating a tube bundle reactor, comprising: introducing a reactant mixture into a tube bundle and converting at least a proportion of the reactant mixture within the tube bundle to a product. The introducing comprises: feeding the reactant mixture into an interior of a feed hood of the tube bundle reactor and passing the reactant mixture on into a feed end of the tube bundle in the form of a fluid stream. The fluid stream has a cross-sectional area on entry into the feed end, and the interior of the feed hood through which the fluid stream flows has an internal volume; where the ratio of internal volume to cross-sectional area is less than 0.35 m.

17 Claims, 5 Drawing Sheets

TUBE BUNDLE REACTOR FOR UNCATALYZED OR HOMOGENEOUSLY CATALYZED REACTIONS

CROSS-REFERENCE TO RELATED APPLICATIONS

This application is a national stage application under 35 U.S.C. §371 of PCT/EP2010/000280, filed Jan. 19, 2010, which claims benefit of European application 09151002.4, filed Jan. 21, 2009.

FIELD OF THE INVENTION

The invention relates to the field of reactors for continuous chemical conversion of reactants of a reaction mixture to products, and especially to a tube bundle reactor and a process for operation thereof. Such reactors are used for continuous conversion of free-flowing substance mixtures which are present essentially as a gas phase and/or liquid phase. The reaction conditions are controlled via the feeding of reactants and via the recycling of the converted mixture emerging from the tube bundle reactor. In addition, the reaction conditions are controlled via operating parameters such as temperature, pressure and flow rate within the reactor, which directly affects the chemical conversion process. In general, in tube bundle reactors, catalysts within the tubes of the tube bundle are also used to restrict the reaction to the site of the catalyst, i.e. to the tube.

Tube bundle reactors are used with or without catalyst for controlled performance of chemical reactions within substance mixtures, especially on the production scale, for a multitude of reactants and products.

STATE OF THE ART

Tube bundle reactors are usually produced by the "shell-and-tube" design, this design being similar to tube bundle heat exchangers. For example, in "Chemical Process Equipment" by Walas, Stanley M., Butterworth-Heinemann, Series in Chemical Engineering, Butterworth-Heinemann, USA, a group of tube bundle reactors which are also considered to be heat exchangers is described on page 569. Whereas, in heat exchangers, only heat is transferred from a primary to a secondary circuit or vice versa, a reaction additionally takes place here in a tube bundle reactor, the heat of reaction being removed or supplied via a medium circuit which is separate in terms of fluid technology but is coupled with regard to heat. The reaction takes place here in the tube bundle, and a heat exchange medium additionally flows within the shell which surrounds the tube bundle, and is circulated and thus forms the medium circuit. The heat exchange medium removes heat from the space within the tubes by the contact with the tube bundle, or supplies heat by virtue of the contact.

Frequently, tube bundle reactors are used as fixed bed reactors for heterogeneously catalyzed reactions. In heterogeneous catalysis, the chemical reaction of reactant fluids or the conversion of the reaction mixture takes place over a catalyst which has a different state of matter than the reactants and in this case is configured as a solid. The solid and the surface formed by it, which constitutes the catalyst, are secured within the tube bundle reactors in the case of fixed bed reactors, whether as solids which are held within the tubes of the tube bundle or in another way, in which the catalyst is fixed or secured within the tubes of the tube bundle, such that the reactant fluid can be conducted past without entraining the catalyst. Examples of heterogeneously catalyzed reactions in which tube bundle reactors are used as fixed bed reactors are the oxidation of benzene to maleic anhydride, the hydrogenation of crotonaldehyde to 1-butanol, the synthesis of vinyl acetate from ethylene, acetic acid and oxygen, and the synthesis of vinyl chloride from ethylene and chlorine. These and other examples can be found, for example, in "Perry's Chemical Engineers Handbook", $7^{th}$ edition, 1997, pages 23-38. In all cases, the processes are performed at low pressure. The process with the highest pressure specified is the hydrogenation of crotonaldehyde to butanol, which takes place at about 39 bar (see, for example, "Applied Industrial Catalysis", Vol. 1, Academic Press, 1983, page 51). The vinyl chloride synthesis is performed, for example, at only 4-6 atm (cf. "Applied Industrial Catalysis", Vol. 1, Academic Press, 1983, pages 251-252 and 264).

Various configuration variants of tube bundle reactors are known in these publications and from the literature. For example, publications DE 202 19 277 U1, DE 202 19 278 U1 and DE 202 19 279 U1 describe configurations of details of tube bundle reactors, all of which serve as fixed bed reactors. These publications relate to the heat management within tube bundle reactors, one proposal being to cool cooling medium in the reactor from the outside at the height of the ends of the tube bundle by means of cooling coils mounted on the outside of the reactor, or to influence the thermal management by conducting in fresh cooling medium by means of an external bypass. Secondly, heat exchangers are disclosed, which are connected to cooling coils at the outer reactor wall at the height of the tube bundle ends, in order to adjust the temperature within the tube bundle and especially at the tube bundle ends of the reactor. However, in all configurations described there, tube bundle reactors in which the tube bundle is designed as a circular cylinder are used, and large-volume attached hoods serve for attachment to the tube bundle.

Moreover, U.S. Pat. No. 4,221,763 describes a tube bundle reactor with a cylindrical middle jacket section which surrounds the circumference of the tube bundle, and with concluding flanged-on hoods which serve for feeding or for discharge. In this case, a group of tubes connected to the tubes of the tube bundle is mounted in the feed hood. The volume of the feed hood is used to mix and convert reactants. For cooling, cooling fluid flows around the reactor bundle. The reactor construction detailed there has several disadvantages. The construction is complex and consequently costly. Only the outer shell is pressure-resistant, which gives rise to a risk of failure in that the reaction tubes have thin walls and are supported only by the opposing pressure of the cooling medium. If the pressure of the cooling medium falls, this leads to bursting of the reaction tubes, which is also the case for the pressure drop on the reaction side. The pressure difference in the event of such a failure, which exists between cooling medium (high pressure) and reaction medium (reduced pressure), can easily destroy the structural integrity of the reaction tubes.

Document DE 1 601 162 describes a tube bundle heat exchanger set up to perform reactions. The heat exchanger comprises tubes filled with catalyst, such that the reaction takes place only in the tube bundle. Within the tube bundle, baffles are used between the tubes in a controlled manner, in order to reduce the individual coolant flow between the tubes. In the hoods, which are not explained in detail, no reaction takes place, since no catalyst is present therein.

EP 1 080 780 A1 likewise discloses a reactor with a tube bundle whose tubes are equipped with a fixed catalyst bed. The heat of reaction of the reaction of reactants in the gas phase is thus generated exclusively in the tube bundle, which has an annular cross section for better cooling. An inner region of the tube bundle remains empty in order to improve the heat removal and to prevent hotspots. This measure relates merely to the tube bundle. In the hoods, essentially no reaction takes place, since no catalyst material is present there.

EP 1 080 781 A1 discloses a reactor similar thereto, which likewise serves for catalytic gas phase oxidation, wherein the cooling fluid is mixed suitably for efficient removal of the heat which arises essentially only at the fixed catalyst bed tube bundle. Here too, essentially no reaction takes place outside the tube bundle in the reactor hoods.

For particular chemical reactions, tube bundle reactors offer a whole series of advantages. One is that the flow in a tube bundle reactor comes very close to ideal plug flow with exceptionally low backmixing. Tube bundle reactors are therefore particularly suitable for reactions in which further reactions can occur. Especially when the target products formed react rapidly to give conversion products, high selectivities can be achieved with tube bundle reactors. This is also true in the case of higher conversions. Moreover, tube bundle reactors offer the advantage that the apparatus complexity and the complexity with regard to measurement and control are significantly lower than, for example, in the case of a stirred tank cascade with comparable output.

In addition, tube bundle reactors offer a large heat exchange area by virtue of the large total area of the outsides of the tubes. It is thus also possible to efficiently control the reaction temperature in the case of strongly exothermic or endothermic reactions. More particularly, a narrow temperature range can be maintained and temperature gradients within the reactor or within the tube bundle can be efficiently controlled or suppressed. For a given production capacity, a further advantage is the significantly lower pressure drop in a tube bundle reactor compared to a reactor consisting of a single reaction tube. Therefore, the power which has to be applied in order to convey the reaction mixture through the reactor is also significantly reduced in the case of use of a tube bundle reactor.

According to the prior art, tube bundle reactors, especially tube bundle reactors for heterogeneously catalyzed reactions, are designed with large-volume entry and exit hoods. These are designed, for example, as hemispheres or as rotational ellipsoids with a similarly voluminous form to hemispheres. The reason for this is that large-volume entry hoods reduce the dynamic pressure of the incoming reactant stream and bring about homogeneous flow to all reaction tubes of the tube bundle. The volume within the entry hood thus serves to decompress the reaction mixture after entry and, partly as a consequence thereof, the large-volume conduction of the reactant stream results in the entry rate and the pressure at all entry ends of the reaction tubes being about the same. More particularly, the entry hoods in the prior art are preferably configured such that solely the broad fanning-out over the large volume within the hood gives rise to a homogeneous pressure distribution within the cross section of the reaction stream at the entry end of the tube bundle. The large volume prevents the directed entry flow from arriving only at the middle of the tube bundle and the reaction tubes at the edge being charged with significantly lower pressure or with a significantly lower flow of the reactant stream.

One example of this is the construction in DE 202 19 277 U1, in which, from FIG. 1, it is directly evident from the flow arrows within the hoods, especially within the entry hood, that the volume or the shape of the interior of the hood serves to homogenize the flow behavior. The reactor shown there is, however, designed as a fixed bed reactor, such that the reaction takes place essentially within the tube bundle; as a result, the control of the course of reaction is restricted to the volume of the reactor bundle, whereas, in the configuration of the hood, the reactions which take place there and the associated change in temperature need not be taken into account. This procedure can also be discerned from DE 202 19 279 U1, in which entry section and exit section of the tube bundle are used with additional ring channels for temperature control, which, however, owing to their arrangement on the tube bundle, are not used for temperature control within the entry hood, i.e. outside the tube bundle, nor are suitable for temperature control within the entry hood.

When, however, the reaction is not restricted to the tube bundle, for example in reactions which proceed uncatalyzed, or when the catalyst is dissolved homogeneously in the reaction mixture or forms a suspension with it, this gives rise to only inadequate means of controlling the course of the reaction for the reaction within the entry hood when reactors configured for heterogeneously catalyzed reactions, in which the reaction proceeds essentially in the tube bundle, are used. Owing to the large volume within the entry hood, the reactions can, however, proceed in an uncontrolled manner as early as within the entry hood when the reaction is not restricted to the tube bundle. This leads, for example, in the case of strongly exothermic reactions, to significantly rising temperatures, such that losses of product of value occur as a result of undesired chemical reactions, for example polymerization. In addition, exothermic reactions, especially in the entry hood, can cause the temperatures to rise to such an extent that the reaction gets out of control and runs away. In the extreme case, this can even lead to destruction of the reactor.

EP 1 882 518 A2 describes a process for changing the temperature of a tube bundle reactor, in which a temperature control gas is conducted past the tube bundle when the heat carrier is no longer being circulated sufficiently, the temperature control gas being throttled suitably with regard to the volume flow in the course of startup or rundown. However, this does not relate to the heating or cooling of the mixture present in the entry hood or in the exit hood of the tube bundle reactor.

Tube bundle reactors configured for heterogeneously catalyzed reactions are equally unsuitable when the reactants and/or the products of the desired reaction are thermally sensitive. The comparatively high residence times in the large-volume entry and exit hoods can cause substantial losses of product of value and low selectivities to occur.

A further disadvantage of customary large-volume entry hoods is that uncontrolled reactions in the entry hood (or else in the exit hood) can take place in the event of failure of the energy supply of the reaction mixture pump. If the energy supply fails, input and output of the reactants and products no longer take place, and so a considerable amount of reaction mixture remains within the hoods, which can be influenced only to a minor degree with regard to the temperature owing to the low surface area based on the volume of the hoods.

Moreover, the shape of hoods of known reactors is determined by the statics and stability, which have the aim of minimizing transverse forces within the hood and thus of achieving sufficient pressure resistance even in the case of low sheet metal thicknesses.

In summary, large-volume entry and exit hoods in tube bundle reactors are used for decompressing the incoming mixture and distributing it homogeneously between the tubes of the tube bundle, such that the entry pressure or the entry rate at the entry end of the tube bundles is homogeneous. The prior art does not disclose any kind of alternative mechanisms for homogeneous feeding than the fanning-out of the feed stream by means of large-volume hoods. The same applies to the exit hood, which is likewise configured with a large volume in order not to generate any backup in the tubes at the edge and in order to bundle the mixture leaving the tube bundles over a large volume to one exit stream without generating significant turbulences. By virtue of the large volume within the hoods, a large amount of reaction mixture is conducted there, which leads, especially in the case of uncatalyzed reactions or in the case of homogeneously distributed catalysts, to high temperature gradients within the hoods, which cause an increased extent of undesired reactions. Firstly, this leads, in the case of continuous operation, to low selectivity associated with the low controllability within the volume of the hoods, and leads, in the event of faulty operation, in which the reaction mixture is transported only inadequately, to critical temperature and pressure conditions which can lead in the extreme case to the uncontrolled exit of reaction mixture.

It is therefore an object of the invention to provide a tube bundle reactor or a process for operating a tube bundle reactor, with which uncatalyzed and homogeneously catalyzed reactions can also be performed with high selectivity. It is an associated object to provide a tube bundle reactor and a process for operating a tube bundle reactor, which enable a precise temperature regime even within the hoods, for example in the conversion of thermally sensitive reactants and/or for reactions with thermally sensitive reaction products. The inventive tube bundle reactor and the inventive process are suitable especially for uncatalyzed reactions and for reactions in which the catalyst is not restricted to the tube bundle in terms of location, i.e. reactions with catalysts dissolved homogeneously in the reaction mixture and reactions with catalysts suspended in the reaction mixture, i.e. with heterogeneously distributed catalysts, as, for example, in the case of hydrogenation with Raney-Ni as the catalyst in particulate form. Moreover, the inventive tube bundle reactor and the inventive process are also suitable for reactions with fixed bed catalysts.

SUMMARY OF THE INVENTION

The concept underlying the invention is to equip the entry hood through which the reaction mixture is fed to the tube bundle of a tube bundle reactor with a smaller internal volume. This allows the temperature of the mixture within the hood to be controlled better, while less mass of the reaction mixture is present within the hood, based on the mass within the tube bundle, compared to prior art reactors. This can achieve the result that the temperatures at different points in the reactor (i.e. hood and tube bundle) can be essentially matched to one another, and essentially homogeneous reaction conditions thus exist in the overall reactor, even if flow conditions and thermal conduction mechanisms within the hood differ from those in the tube bundle. Especially the temperature in the hood can be controlled precisely by external heat supply or heat removal with the inventive construction, and the inventive construction of the hood prevents inhomogeneities of the reaction conditions within the hood itself. The flat design allows, by virtue of the increased heat transport (based on the hood volume), the suppression of hotspots in the hood, such that it is also possible to obtain thermally unstable products with a high selectivity, since the thermal distribution in the hood is essentially homogeneous. The reaction conditions in the entire hood(s) correspond(s) essentially to the reaction conditions in the tube bundle, as a result of which the selectivity is not impaired by temperature deviation in the hood (compared to the tube bundle). Nearly the entire reaction mixture in the hood has the same temperature as the mixture within the tube bundle. Only a negligible proportion of the mixture or no proportion of the mixture within the hood has a temperature which differs (even only slightly) from the temperature within the tube bundle. More particularly, the reaction conditions within the hood can be matched better to the reaction conditions within the tube bundle, since only a small amount of reaction mixture is present in the hood, based on the mass within the tube bundle and based on the throughput rate.

A relatively small volume refers to the volume of the inventive hood, based on the size of the reactor, which is smaller than the volume of a prior art hood, based on the size of the reactor. In this context, the size of the reactor can be equated (i) with the cross section of the tube bundle, (ii) with the volume of the interiors of the tubes which form the tube bundle, (iii) with the volume which encompasses the tube bundle overall, (iv) with the volume of a shell which encompasses the tube bundle, or (v) with the throughput of the tube bundle reactor in regulated operation. In addition, other geometric or process technology reactor parameters can be used in order to serve as a reference point or standard for the hood volume. Prior art hoods are considered here to be the hood forms described in the introductory part of the description, i.e. hemispherical hoods, bell-shaped hoods or customary hoods which are shaped as a rotational ellipsoid and are part of a prior art tube bundle reactor.

The inventive low volume of the feed hood is equivalent to a flat design of the feed hood, the profile of which, in cross section, differs from hemispherical, customary rotational ellipsoids and other bell-shaped prior art hoods in that the cross section at the cover at which the mixture is fed in differs significantly from the cross section at the connection end of the hood to the tube bundle section of the reactor, and the cross section is simultaneously increased significantly for the short distance between cover and connection end toward the connection end. In other words, the opening profile from hood cover up to the connection to the tube bundle section of the reactor is associated with a cross-sectional area increase along the longitudinal axis toward the tube bundle, which is significantly greater than the increase in the case of customary hemispherical or rotational ellipsoidal hoods. The connection end is the end of the hood which faces the tube bundle or abuts it, i.e. abuts the feed end or the release end of the tube bundle.

The higher growth in cross-sectional area in the case of the inventive construction of the tube bundle reactor is automatically associated with a ratio of surface area of the hood to internal volume of the hood which is significantly greater than for customary hood constructions, which gives rise to better heat removal (or heat supply) based on a mass to be cooled (or generally whose temperature is to be controlled) within the small internal volume of the hood. Heat supply or heat removal is achieved here especially through heat conduction (for example to a medium such as the ambient air or else a cooling fluid) and by natural convection. In particular, however, the cross-sectional increase which is necessary to supply an external mixture stream to the tube bundle is associated with a relatively low proportion of reaction mixture outside the tube bundle (i.e. within the feed hood) based on the total amount within the tube bundle reactor or within the tube bundle. By virtue of the small volume and hence the small amount of reaction mixture within the feed hood, i.e. outside the tube bundle, the reaction conditions provided can be more homogeneous, such that the reaction conditions in the hood can be matched to the reaction conditions of the tube bundle, and hence temperature (and pressure) in the hood and in the tube bundle are essentially the same. In addition to the small volume of the inventive hood, the flat form thereof is also achieved by the large surface area based on the hood volume. Owing to this large surface area (based on the volume), heat of reaction generated within the volume can be removed efficiently over the large surface area (i.e. especially via the tube plate of the tube bundle, which is attached to the hood and also via the side of the hood facing outward). The flat and low-volume design prevents the formation of hotspots within the hood, since the heat can be removed efficiently, i.e. with a high heat transfer rate, from any point in the hood. Especially in the case of reactions with homogeneously distributed catalyst and in the case of reactions which proceed without catalyst or else outside the tube bundle, it is thus also possible to achieve stable conditions in the hood, or else the conditions in the hood can be matched to the conditions in the tube bundle. Especially in the case of critical reaction situations, for example in self-accelerating reactions or when the reaction mixture flow is disrupted, the small amount of reaction mixture within the feed hood, i.e. outside the tube bundle, can be controlled better, for reasons including the small amount, and the better radiative cooling of the hood, which arises through the greater surface/internal volume ratio of the hood compared to prior art hoods. The release of heat via the hood adds onto the significant release of heat via the tube plate, which is cooled with cooling medium of the tube bundle on the side facing away from the hood. The cooling of the reaction mixture in the hood therefore takes place from both sides, i.e. from the tube plate and from the opposite hood cover. Typically, the cooling effect by the tube plate is significantly stronger than the cooling effect at the hood cover, but it is important, especially in the case of thermally sensitive products, that the temperature does not deviate significantly from the target at any point (i.e. not at the hood cover either).

The inventive flat design of the feed hood can thus be defined by the cross-sectional area increase based on the distance between cover of the feed hood, i.e. the inner surface of the hood opposite the tube bundle end, and connection point to the tube bundle section of the tube bundle reactor. In this context, to cover the cross-sectional increase, the cross section (in the case of a plurality of entry holes or entry sites: the total cross section) through which the fluid stream is fed to the hood is expressed as a relationship with the cross section of the fluid stream which flows through the end of the feed hood facing the tube bundle. More particularly, the cross section of the feed hood at the tube bundle can be expressed as a relationship with the total cross section of all entry holes at the opposite end of the feed hood, in order to cover the cross-sectional growth. The cross-sectional growth is based on the hood height. The hood height is the distance between the two ends of the hood, i.e. between the end facing the tube bundle and the opposite end. According to the invention, the cross section of the hood from the start of the hood to the end of the hood (which is at the feed end of the tube bundle) increases within a short distance along the longitudinal axis of the tube bundle reactor. This is in contrast to the cross-sectional area growth in the prior art according to a hemispherical form or according to a known rotational ellipsoidal form. A measure which can be reported for the cross-sectional growth may be the growth of the cross-sectional area in percent per millimeter. Typical values for known reactors with a customary hemisphere or circle segment form have a cross-sectional area growth of 0.1-0.3%/mm, whereas, in the case of the inventive configuration, the feed hood typically has values of at least 1%/mm, at least 2%/mm, at least 3%/mm, at least 4%/mm, at least 5%/mm, at least 6%/mm, at least 7%/mm, at least 8%/mm, at least 10%/mm, at least 12%/mm, at least 15%/mm, at least 20%/mm or the like. It should be noted here that, for hoods with the form of rotational paraboloids or of hemispheres, the idealized form does not form the basis in this consideration, in the case of which a planar section does not form a circle but a point directly at the surface of the sphere or at the tip of the rotational paraboloid. Instead of the idealized mathematical form, the starting point here is the real form, in which the feed/removal orifices are present at the hood cover. The location of these orifices is employed as the reference point for capturing the cross-sectional growth. The cross-sectional growth is thus based on the widening of the cross section of the flow which is provided by the delivered and incoming reaction mixture. The cross-sectional growth is considered to be the growth in the cross section taken up by the flowing reaction mixture. Since the flow is conducted along the inner surface of the feed hood, the profile thereof is crucial to the cross-sectional growth. The inventive hood form and the definition thereof by the cross-sectional increase along the longitudinal axis toward the tube bundle of the tube bundle reactor is additionally illustrated in detail by the description of the figures. The cross-sectional growth is not a differential parameter, but is measured by the comparison of the cross-sectional area of the entry orifice/all entry orifices of the hood with the cross-sectional area that the hood has at the feed end of the tube bundle. The cross-sectional growth is thus based over the entire height of the hood, i.e. the distance from feed end to the inner surface of the hood opposite the feed end. In the case of a plurality of feed streams, a measure used for the height may be an averaged height of all feeds, or the greatest of all heights.

In a further aspect of the invention, the flat design is characterized in that the internal volume of the hood is expressed as a relationship with the cross-sectional area at the transition to the tube bundle. While the internal volume characterizes the mass of the reaction mixture within the hood (the mass of the reaction mixture within the hood, owing to the lack of control means, being critical for the course of the reaction and especially the selectivity), the cross-sectional area of the hood at the feed end of the tube bundle, i.e. at the transition of the hood to the tube bundle, characterizes a relevant reference parameter for qualitative estimation as to whether the internal volume and hence the hood has a flat configuration, or whether a relevant amount of reaction mixture based on the cross section of the tube bundle is capable of significantly altering the course of the reaction within the hood from the course of the reaction within the tube bundle. In other words, it is desired in accordance with the invention that the internal volume is relatively small and the corresponding cross-sectional area is relatively large, such that the total amount of the reaction mixture (considered in absolute terms) in the internal volume, even in the case of normal or low flow rates, can rapidly enter the tube bundle through the cross-sectional area, in order to be able to be matched to the temperature and pressure conditions there. Thus, the residence time of the mixture in the hood is lower before it enters the tube bundle, as a result of which the critical period during which the mixture resides in the hood is shortened significantly. The residence of mixture in the hood is more critical than the residence of the mixture in the tube bundle, because the temperature in the tube bundle can be controlled significantly better.

Typical designs for hoods, especially for feed hoods of prior art tube bundle reactors, have, owing to the projecting form, a ratio of internal volume to cross-sectional area of 0.6 $m^{-5}$-0.8 $m^3$. This means that, per square meter of cross-sectional area at the entry (or at the exit) to the tube bundle, i.e. at the tube plate, 0.6 $m^3$-0.8 $m^3$ of reaction mixture is present upstream of the tube bundle, or stored in the release hood downstream of the tube bundle, and is thus present outside the temperature control provided by the tube bundle cooling. In other words, per square meter of entry area into the tube bundle, 0.6 m³-0.8 m³ of reaction mixture must be stored intermediately in the case of a customary feed hood between entry into the feed hood and actual entry into the tube bundle, without ability to control the process conditions as they are controlled within the tube bundle. Especially in the case of a sudden failure of the transport systems for the reaction mixture, it becomes clear that a considerable amount of reaction mixture is present outside the controllable tube bundle. Therefore, in accordance with the invention, a ratio of internal volume to cross-sectional area of ≤0.5 m, ≤0.4 m, ≤0.35 m, ≤0.3 m, ≤0.25 m, ≤0.2 m, ≤0.15 m, ≤0.1 m, ≤0.08 m or ≤0.05 m is provided. This achieves the effect that, in the feed hood and if appropriate also in the release hood connected to the release end of the tube bundle, based on the capacity of the tube bundle which is determined by the cross-sectional area of the tube bundle, less volume or less mass of the reaction mixture is present outside the tube bundle within the tube bundle reactor.

In a further aspect of the invention, the flat design of the feed hood (or else of the release hood) can be achieved through a suitable ratio of a maximum distance between the two opposite ends of the hood (i.e. the hood height between hood cover and tube plate) relative to the cross-sectional area at the transition to the tube bundle. The maximum distance refers to the maximum internal height of the internal volume, the distance being measured between inner surface of the feed hood and feed end of the tube bundle (i.e. start of the tube bundle). The maximum distance can also be referred to as the hood height in numerous suitable forms of the hood, i.e. as the height of the hood cover with respect to the end of the hood attached to the tube bundle. In addition, the maximum distance, without reference to the feed end of the tube bundle, can be considered as the maximum distance between the inner surface of the feed hood and that plane with which the feed hood concludes. In the same way, this defines the design of the release hood, in which case the release end of the tube bundle takes the place of the feed end. The maximum distance thus refers to the maximum internal height of the hood in the case of an entirely convex form of the hood or of the inner volume of the hood, based on the middle of the tube bundle reactor, i.e. on the tube bundle. In another embodiment, in which the hood is not entirely bent in convex form, but is generally present in a form which concludes in a plane at the tube bundle, the profile in between being homogeneous in parts, the maximum distance is calculated as the distance of the site or of the sites which has/have the greatest distance from the concluding plane of the feed hood. For example, one design comprises a hood with a base which is flat in parts or completely flat, the base being configured parallel to the concluding face of the hood. This design comprises, for example, a cylindrical design in which the base extends completely within one plane, and is joined to the tube bundle, or a reactor wall which surrounds the tube bundle, via side walls which extend parallel to the longitudinal axis of the tube bundle. In this case, the maximum distance corresponds to the distance between base and end of the tube bundle or between base and concluding plane of the hood. The concluding plane of the hood may be within the plane in which the end of the tube bundle lies, or may be offset from this along the longitudinal axis of the tube bundle, for example when the end of the tube bundle is offset from the concluding plane of the hood toward the release hood. In the intermediate space which arises from the offset, feed lines or a gap or perforated plate may be provided, in order to supply the fluid flow emerging from the concluding plane of the hood to the tube bundle. The cross-sectional area is described, as already stated, as the area that the hood or the hood interior has at the feed end or at the release end. The cross-sectional area can also be considered to be the area of the cross section of the hood in the concluding plane of the hood. More particularly, the cross-sectional area can be considered the area that the reactor wall has at the height of one of the ends of the tube bundle. The definitions of the cross-sectional area used above are freely exchangeable with the latter definitions. According to the invention, the inventive design of the hood is achieved by virtue of the ratio between the maximum distance thus defined, i.e. the hood height, relative to the cross-sectional area thus defined being ≤0.15 m$^{-1}$, ≤0.1 m$^{-1}$, ≤0.075 m$^{-1}$, ≤0.06 m$^{-1}$, ≤0.05 m$^{-1}$, ≤0.04 m$^{-1}$, ≤0.03 m$^{-1}$, ≤0.025 m$^{-1}$, ≤0.02 m$^{-1}$ or ≤0.01 m$^{-1}$. Since the maximum distance of the hood is clearly linked to the internal volume via the geometric form of the hood, the maximum distance based on the cross-sectional area is also a suitable measure for the flat design of the hood. The flat design prevents a large amount of reaction mixture from being present within the reactor, but outside the tube bundle. As already noted, this amount envisaged in the hoods cannot be controlled to the same degree as the mixture within the tube bundle, such that, in the case of numerous reactions and operating parameters in the hood, other thermal conditions develop than in the tube bundle when the hood encompasses a significant amount of reaction mixture. As already noted, the definition of the flat design allows the amount of reaction mixture upstream or downstream of the tube bundle to be expressed as a relationship with the cross-sectional area of the tube bundle, the volume (defined by parameters including the maximum distance) of the reaction mixture outside the tube bundle being based on the capacity of the tube bundle, which is defined by the cross-sectional area.

In a further aspect of the invention, the flat design of the feed hood (or else of the release hood) can be described by the maximum distance of all points within the hood from the closest heat-removing surface. Heat-removing surfaces refer to the reactor bases (especially the reactor base at the feed) and the inner surface of the hood. All points are understood to mean all sites in which reaction mixture may be present, for example within a gap of the hood. In this context, reaction mixture cannot be present within internals or components present in the hood. For example, no reaction mixture can be present in a deflecting device; the sites within the device should therefore not be used to calculate the maximum distance. When the maximum (=the maximum distance) is low, it is ensured that all points are close to heat-removing surfaces, such that no hotspot and no significant temperature gradient or significant temperature increase can arise. Moreover, this ensures that the conditions (for example the temperature) in the hood are matched or essentially identical to the conditions in the tube bundle.

For example, the maximum thus defined, i.e. the maximum of the distance of all points within the hood from the closest point in each case on the inner surface of the hood (i.e. feed hood or release hood) or from the tube plate which concludes the hood, in the case of a reactor with a reactor bundle diameter of 2 or 3 m, is less than 10 cm, preferably less than 5 cm or less than 3 cm. The tube bundle reactor preferably has a diameter of 4.5 m-0.5 m; the maximum in the case of a diameter of 4.5 m is preferably less than 25 cm or less than 15 cm. The maximum in the case of a diameter of 0.5 m is preferably less than 3 cm or less than 2 cm. In principle, the maximum (=the maximum distance) is based on the diameter of the tube bundle, as defined above by the ranges. In the case of other diameters (diameter outside the above ranges), the maximum should be adjusted in a directly proportional manner according to these specified ratios. Based on the diameter of the tube bundle, the maximum is thus preferably ≤5%, ≤2%, ≤0.8%, ≤0.6%, ≤0.4%, ≤0.25%, very especially preferably ≤1%, of the diameter of the tube bundle. The diameter may be based on the internal cross section of the reactor wall or on the total cross section of the tube bundle or, preferably, on the cross section of the hood at the end facing the tube bundle. In the case of noncircular cross sections, instead of the diameter, the maximum radial separation of opposite points can be used, or the separation between center and circumference, averaged over the entire circumference. More particularly, the diameter can be considered the diameter of the circle inscribed within, or the diameter of the circle inscribed without.

The above definitions of the flat design via cross-sectional growth, ratio of internal volume to cross-sectional area and ratio of maximum distance or height to cross-sectional area can be used individually and also in any combination with one another. For instance, the design can be defined only by the above-defined specifications of the cross-sectional growth, only by the specifications of the ratio of internal volume to cross-sectional area, or only by the specifications of the ratio of the maximum distance relative to the cross-sectional area. The above-defined parameter specifications can, however, also be combined with one another in any manner by a logical AND linkage. In addition, the restrictions of all three parameters can be used to define the flat design.

The invention is thus implemented by a tube bundle reactor comprising a tube bundle which has a feed end which is connected to a feed hood of the tube bundle reactor, wherein the feed hood is configured in a flat design. The flat design of the feed hood is configured with a cross-sectional area at the feed end and an internal volume, where the ratio of internal volume to cross-sectional area in a preferred embodiment is 0.35 m. Moreover, the feed hood is configured in a flat design with a maximum distance between feed hood and feed end (="hood height"), where the ratio of maximum distance to cross-sectional area in a preferred embodiment is ≤0.1/m. Moreover, the feed hood is configured in a flat design with a cross-sectional growth beginning with a total cross-sectional area of entry holes through which the mixture is fed to the hood toward the tube bundle, where the cross-sectional growth proceeding from the total cross-sectional area of the entry holes to the cross-sectional area at the feed end (or at the hood end) is at least 0.6%/mm along the longitudinal axis of the tube bundle toward the tube bundle. The release hood preferably also has this flat design, with exit holes of the release hood in place of the entry holes and the release end of the release hood in place of the feed end. Furthermore, the same definitions of the flat design apply to the release hood as to the feed hood.

The concept underlying the invention is also implemented by a process for operating the tube bundle, comprising introducing a reactant mixture into a tube bundle and converting at least a proportion of the reactant mixture within the tube bundle to a product. In this process, the introducing step comprises feeding the reactant mixture into an interior of a feed hood of the tube bundle reactor. The reactant mixture is passed on into a feed end of the tube bundle in the form of a fluid stream from the hood interior to the tube bundle. In a first aspect of the invention, the fluid stream has a cross-sectional area on entry into the feed end, and the interior of the feed hood through which the fluid stream flows has an internal volume, where the ratio of internal volume to cross-sectional area is less than 0.35 m. In a second aspect of the invention, the fluid stream has a cross-sectional area on entry into the feed end and a maximum distance between the fluid stream which is passed on into the feed end and the feed end, where the ratio of maximum distance to cross-sectional area is less than 0.1/m. The maximum distance refers here to the distance between a portion of the fluid stream which has the greatest difference from that plane in which the cross-sectional area lies. The cross-sectional area can also be based on the fluid stream, or else on the internal diameter of a reactor wall which surrounds the tube bundle at the feed end, or may be the cross section of the feed hood at the end of the feed hood facing the tube bundle. All these reference points serve for exchangeable definitions of the flat design and can be combined with all embodiments and features. The definitions of the flat design define merely the geometric form of the hood or hoods and are combinable with all other features of the inventive tube bundle reactor, especially with embodiments which have internals in the hood, have specific connection features, or have other features which are not directly connected to the geometric configuration of the hood.

The form of the feed hood (and hence the form of the internal volume of the feed hood) is a form which, proceeding from the end facing away from the tube bundle, extends toward the tube bundle homogeneously at least in parts or strictly homogeneously at least in parts or abruptly at a certain distance from the tube bundle. At least a section of the internal volume of the feed hood, which is arranged at the feed end and preferably abuts the feed end or the hood end, is configured in cylindrical form. The cylinder which defines the cylindrical form preferably has a circular cross section, but oval or polygonal forms are also possible.

The section of the internal volume of the feed hood can also be configured as a hollow cylinder or in the form of a hollow cylinder with circular inner and outer cross section. The form of a hollow cylinder is provided by the inside of the feed hood as the outer boundary, i.e. as the side wall of the cylinder, and by a body which is arranged within the feed hood and which provides the inner boundary of the hollow cylinder. Preferred embodiments of the body are described in detail below. The section in which the internal volume has the form of a hollow cylinder and thus forms, for example, an annular gap preferably does not directly adjoin the feed end of the tube bundle, but rather is connected to the feed end of the tube bundle via a gap. In this case, the internal volume within the gap preferably has a continuous cross section, i.e. in the form of a circular cylinder, or the internal volume is configured as a multitude of cylinders which are distributed essentially homogeneously. For example, a perforated plate defines, by virtue of its orifices, a multitude of cylinders.

The design of a section of the internal volume as a hollow cylinder serves to not allow the mixture flowing into the hood to flow directly into the tube bundle, and instead to protect the tubes opposite the entry hole or the entry holes from direct inflow. For this purpose, the reaction mixture flow which points directly toward the tube bundle is blocked in this section by the inner cylinder of the hollow cylinder, such that the reaction mixture cannot enter the tube bundle unimpeded and directly. The conduction of the reaction mixture in the form of a hollow cylinder ensures that the charging of the tube bundle with reaction mixture is not concentrated on the middle of the tube bundle or another section of the tube bundle, and instead that the entering fluid stream is widened by the blockage, in order to flow around the inner cylinder of the hollow cylinder. As a result, outer regions of the tube bundle are also charged with a sufficient flow.

Moreover, this inventive concept is implemented by a step of introducing, the introducing step comprising: introducing the fluid stream with a constant cross-sectional area; the passing-on of the fluid stream within the feed hood comprising: spreading application of the fluid stream introduced; deflecting the spread fluid stream toward the feed end; conducting the deflected fluid stream in the form of a hollow cylinder, and combining the fluid stream to give a combined fluid stream with a constant cross section. In addition, in accordance with the invention, the combined fluid stream is introduced into the feed end of the tube bundle. The fluid stream is provided by reaction mixture which is introduced into the hood and is fed from this to the tube bundle.

To form at least one section of the internal volume as a hollow cylinder, a deflecting device is arranged within the internal volume of the feed hood. The deflecting device is arranged between a feed connection of the feed hood, i.e. the end of the feed hood facing away from the tube bundle, and the feed end of the tube bundle. As a result of this, at least parts of a fluid stream which flows from the feed connection of the hood into the feed hood are deflected outward in radial direction or in a direction which points away from the longitudinal axis, before the fluid stream enters the feed end and hence the tube bundle. The deflection apparatus thus comprises a surface leading outward from the longitudinal axis, which may especially extend radially. This surface of the deflection apparatus faces the feed connection of the hood. The fluid stream hits this surface and is directed outward, away from the longitudinal axis of the reactor. At this surface, the fluid stream is thus conducted outward, in order to prevent or to block direct inflow of the reaction mixture from the feed connection of the hood unimpeded into the tube bundle.

The attribute "directed outward" refers to a direction which is inclined relative to the longitudinal axis of the tube bundle or to the longitudinal axis of the feed hood or of the deflection apparatus, and which points away from the longitudinal axis. The direction thus defined may cause a deflection of the fluid stream by 90°, i.e. from a direction parallel to the longitudinal axis to a direction perpendicular to the longitudinal axis (=radial direction), or may be any desired direction which has such a radial component, in addition to a component which leads in longitudinal direction and is directed parallel to the longitudinal axis. The deflecting apparatus thus comprises a surface which enlarges the circumference of the fluid stream entering the feed connection. This spreads out the fluid stream. The deflecting apparatus can be interpreted as a blocking element which prevents the flow entering at the feed connection from entering the feed end of the tube bundle directly without widening, and hence essentially only part of the cross-sectional area of the tube bundle from being supplied with a sufficient or sufficiently defined flow of reaction mixture, while other sections, for example outer sections, receive a lower fluid flow of reaction mixture. The deflecting apparatus is provided, for example, as a baffle plate, especially in circular form, which directs the reaction mixture outward and forms, with the hood, an annular gap through which the reaction mixture leads in axial direction, i.e. in a direction parallel to the longitudinal axis, in hollow cylindrical form. The greater circumference of the fluid flow provided by the deflecting apparatus is broader than the cross section of the feed end of the tube bundle at least by a minimum degree, the deflecting apparatus, by virtue of its geometric dimensions, configuring the surface area of the fluid stream such that the internal cross section of the hollow cylindrical form of the deflected fluid stream is greater than the cross-sectional area of the feed end. The deflecting apparatus and especially the surface thereof thus preferably extend beyond the cross-sectional area of the feed end of the tube bundle, and completely cover the feed end projecting along the longitudinal axis of the reactor. In a further embodiment, the deflecting apparatus extends beyond the cross-sectional area of the tube bundle by an additional edge. Between the surface of the deflecting apparatus facing the tube bundle and the feed end of the tube bundle there is a further continuous gap in the longitudinal direction of the tube bundle, such that the fluid flow, after being deflected by the deflecting apparatus, can collect over a constant cross section, the constant cross section being at least as large or larger by an additional edge than the cross-sectional area of the feed end. This achieves the effect that the deflected fluid flow can collect again between deflecting apparatus and feed end over the entire cross section of the feed end, before the fluid indirectly or directly enters the tube bundle.

In a further embodiment of the invention, the deflecting apparatus comprises a distributor plate whose cross section is less than that of the internal volume of the hood at the feed end. The distributor plate may thus be arranged completely within the internal volume of the feed hood, especially at the end of the hood facing the tube bundle. Between distributor plate and inner surface of the hood, an annular channel is thus formed. The channel runs between the outer edge of the distributor plate and the inside of the hood at the end of the feed hood facing the tube bundle. The cross section of the distributor plate is thus less than that of the internal volume at the feed end, as a result of which a channel is formed, which runs within the internal volume at the outer edge of the plate in axial direction of the plate and around the outer edge of the distributor plate. The formation of the channel between distributor plate and hood corresponds to the section of the internal volume of the feed hood in which the internal volume is formed as a hollow cylinder. The internal volume of the feed hood is thus considered at this point to be the free space within the feed hood, within which a fluid flow can form.

The deflecting apparatus of the tube bundle reactor further comprises a homogenizing plate with a multitude of channels running through it, which are preferably each configured as a cylinder with a longitudinal axis which is parallel to the longitudinal axis of the tube bundle. The homogenizing plate is arranged between the distributor plate and the feed end. More particularly, the homogenizing plate is spaced apart from the distributor plate along the longitudinal axis of the tube bundle, such that an axial gap can form between them, which is constant over the entire cross section of the hood, in order to enable the fluid, after the deflection, to spread out over a wide cross section, i.e. over the entire cross section of the feed hood or of the internal volume section present there. The distributor plate divides a free section of the internal volume between the feed connection and the homogenizing plate. As a result, a further axial gap is likewise formed between distributor plate or the surface of the distributor plate facing the entry end of the feed hood, and the entry end of the feed hood, and extends over the entire cross section of the interior of the feed hood present there. The entry end of the feed hood is the end opposite the tube bundle, and comprises preferably one, more than one or all entry holes through which the feed hood and thus the tube bundle reactor are supplied with reaction mixture. The homogenizing plate thus has the function of homogenizing the deflected fluid flow, once it has been collected again over the entire cross section of the internal volume, with regard to pressure and flow rate, before the fluid stream enters the feed end of the tube bundle. The homogenizing plate may be placed directly on the feed end of the tube bundle, or a gap may be provided between tube bundle and homogenizing plate, in order to enable the individual fluid flows leaving the homogenization plate to be influenced. This influence leads to further homogenization of the flow.

The homogenizing plate serves to back up the reaction mixture before entry into the tube bundle, in order, for example, to achieve a defined pressure drop of 100-200 mbar, for example in the reaction of 1,5,9-cyclododecatriene with dinitrogen monoxide to give cyclododeca-4,8-dienone. This example relates to a specific embodiment; in principle, it is possible to provide pressure drops of 0.01 bar to 10 bar, provided that, in principle, the pressure drop is defined essentially by the homogenizing plate and, by virtue of the pressure drop, homogeneous through-flow (with regard to the throughput) over the cross section of the tube bundle (especially at the feed end) results from the operating parameters and the flow properties of the homogenizing plate. The pressure drop is determined to a crucial degree by the operating parameter range (pressure, temperature, flow rate), which in turn depends significantly on the conversion reaction to be performed. The invention shall not be restricted to the reaction of 1,5,9-cyclododecatriene with dinitrogen monoxide; instead, the invention is suitable for performing a multitude of various conversions and reactions. Preferably, each of the holes of the homogenizing plate is arranged opposite exactly one inlet of a corresponding tube of the tube bundle. Instead of or in combination with the homogenizing plate, homogenization, which is provided by controlled backup of the reaction mixture in the feed hood before entry into the tube bundle, can also be accomplished by providing internals at the feed end of the tube bundle, or else restrictors which narrow the tube inlet in a controlled manner. Such restrictor elements can be secured, for example, by means of screw connections on or in the particular tube inlet; the restrictors provided here may, for example, be screw heads. In this case, each screw head partly covers exactly one tube inlet of a tube. The screw head can be provided with holes, for example when the screw head completely covers the tube inlet. In addition, differences in the form of the screw head or of the restrictor compared to the form of the internal cross section of the tube can reduce the tube inlet at the feed end in a defined manner.

The aspect of the invention which is provided by the homogenizing plate can also be implemented by a process step which is performed in the course of introduction of the combined fluid stream into the feed end of the tube bundle, and which comprises: conducting the combined fluid stream through a multitude of channels of a homogenizing plate which is arranged at the feed end. Against this background, the arrangement of the homogenizing plate at the feed end means an arrangement in which the homogenizing plate directly abuts the feed end, or an arrangement in which a further gap is provided between the homogenizing plate and the feed end, in order to enable fluid streams emerging from the homogenizing plate to influence one another. The homogenizing plate preferably extends over the entire cross section of the feed end and, in the case of projection of the distributor plate onto the homogenizing plate, is completely covered by the latter, the deflecting plate preferably having an additional outer edge which goes beyond the homogenizing plate projected thereon. As already noted, the distributor plate does not directly cover the homogenizing plate by direct contact, and there is instead an axial gap between distributor plate and homogenizing plate, by virtue of the fluid flow, after the deflection, collecting over the entire cross section of the internal volume of the feed hood present there. The homogenizing plate can be implemented as a perforated metal sheet with a multitude of identical circular orifices with a diameter which is less than 30 mm, 15 mm, 10 mm, or 3 mm. Diameters less than 3 mm-1 mm can likewise be achieved, preferably passages obtained by means of a laser. More particularly, the cross section of the individual channels within the homogenizing plate is preferably less than the internal cross section of the tubes of the tube bundle and corresponds preferably to less than 75%, 60%, 50%, 40%, 30%, 20%, 10% or 5% of the internal cross section of the tubes of the tube bundle. The orifices of the homogenizing plate which form the channels are preferably spaced apart homogeneously from one another and have a total cross-sectional area which corresponds to at least 10%, 25%, 30%, 40%, 50%, 60% or 75% of the cross section of the tube bundle (the circle filled by the tube bundle). The distributor plate can be provided as a baffle plate with preferably circular form, which is arranged concentrically to the feed hood. The distributor plate preferably has a longitudinal axis which corresponds to the longitudinal axis of the tube bundle, and which likewise preferably corresponds to the longitudinal axis of the homogenizing plate. The longitudinal axis of the homogenizing plate itself is preferably arranged such that it corresponds to the longitudinal axis of the tube bundle. The distributor plate is preferably configured as an entirely circular plate with a thickness of at least 3 mm and at most 200 mm, preferably with a thickness of at least 10 mm and at most 100 mm and especially preferably with a thickness of 20 mm to 40 mm. These thickness figures are based on a distributor plate with a radius of about 700 mm, 800 mm, 900 mm, 1000 mm, 1200 mm, 1500 mm or 1800 mm.

In a first aspect of the invention, the distributor apparatus extends between the feed end of the tube bundle and the feed connection of the feed hood. The distributor apparatus covers the entire feed end with respect to the fluid stream emerging from the feed connection, in order to completely cover the feed end essentially completely with respect to a direct axial fluid flow from the feed connection by deflecting the fluid stream. As already noted, the covering of the feed end by the distributor apparatus relates to complete coverage projected along the longitudinal axis of the reactor, preferably with an additional outer edge, although, in axial direction, a gap is provided between distributor apparatus and feed end, such that the fluid deflected can collect there over the entire cross-sectional area of the interior.

This aspect of the invention is also implemented by a process step, according to which the deflected fluid stream, which is provided in the form of a hollow cylinder, has an internal cross section which corresponds to the internal cross section of the hollow cylinder. The internal cross section of the hollow cylinder thus corresponds to the surface of the deflecting apparatus which faces the entry holes, said apparatus blocking a fluid flow leading along the longitudinal axis. In the hollow cylinder, which represents the form of the fluid flow, in accordance with the invention, essentially no flow is provided within the internal cross section, while the internal cross section of the deflected fluid stream essentially covers the entire cross section of the feed end with respect to the fluid stream introduced. As already noted, this covering of the feed end by the internal cross section can also be provided with an additional edge, with which the internal cross section of the hollow cylinder of the fluid stream goes beyond the outer edge of the feed end.

In a further aspect of the invention, the product mixture of the feed hood is fed in via an entry hole provided at the longitudinal axis, or via a plurality of entry holes. A plurality of entry holes are supplied via a plurality of feed channels, the entry holes being provided in the wall of the feed hood and leading into the internal volume of the feed hood. In the case of embodiments with a plurality of entry holes, at least one entry hole is arranged outside the center axis of the feed end, the center axis corresponding to the longitudinal axis of a cylindrical tube bundle. In addition, in accordance with the invention, all entry holes may be arranged homogeneously around the center axis, along a circle or within a ring. In the case of a plurality of entry holes, the reaction mixture thus does not enter the interior of the feed hood with a central fluid flow, and the inflow of the reaction mixture is instead already distributed between a plurality of entry sites arranged separately on entry into the inner hood. This already gives rise to a certain distribution on entry of the reaction mixture, which is then homogenized further by the deflecting apparatus. When some or all entry holes are arranged along a circle, the center of the circle preferably corresponds to the middle of the end of the hood facing away from the tube bundle, and preferably corresponds to the point of intersection between hood and longitudinal axis of the tube bundle. This is likewise true of the arrangement of the entry holes within a ring, the width of the ring corresponding preferably to not more than 50%, not more than 30%, not more than 15%, not more than 10%, not more than 5% or not more than 2% of the outer diameter of the ring. This essentially imparts the circular form, although, for example, manufacturing-related deviations from the circle are enabled.

The abovementioned aspect, according to which the tube bundle reactor is configured with a plurality of feed channels, can be achieved as a process step. In the implementation of the invention based on a process, the process according to the invention comprises the feeding of a reactant mixture, wherein the feeding step comprises: dividing a feed stream of the reactant mixture into a plurality of feed streams which are each conducted through one of a plurality of channels before the feed streams enter the interior at entry sites (i.e. the locations of the entry holes), which are mutually spaced apart. In this case, at least one entry site or all entry sites are outside the central axis of the feed end of the tube bundle. Alternatively, all entry sites are arranged homogeneously around the central axis of the feed end of the tube bundle along a circle or within a ring. The features of the center axis, of the circle and of the ring correspond to the features of the center axis, of the circle and of the ring which have already been specified in the preceding paragraph. As already noted, the division before the feeding into the interior enables a preliminary distribution before the fluid streams are deflected.

Suitable arrangement of the entry sites or of the entry holes can prevent, in spite of the deflection, inhomogeneous flow distributions in which certain entry holes or entry sites supply some tubes of the tube bundle preferentially with reaction mixture, whereas other tubes experience lower feeding. According to the invention, therefore, the entry holes are offset relative to the longitudinal axes of the tubes of the tube bundle reactor (i.e. from the longitudinal axes of all holes of the tube bundle reactor), the middle of each entry hole having a maximum distance from the closest longitudinal axes of the tubes. As a result, there is no preferential flow between entry hole and particular tubes of the tube bundle. This feature, which relates to the tube bundle reactor, can likewise be implemented by means of a process step, wherein, in the division of the feed stream between different entry sites, the entry sites are offset from longitudinal axes of tubes of the tube bundle reactor, and the center of each entry site has the maximum distance from the closest longitudinal axes of the tubes. This defines the step of feeding the reaction mixture in more detail by the spatial arrangement of the entry streams (which are defined by the entry sites) relative to the tubes.

In a further aspect of the invention, the feed channels are provided by dividing tubes, each of which has a Y division which is attached to two of the entry holes, or two of the entry sites are supplied with reaction mixture, or which is attached to a further Y division. A Y division is a split of a channel (which is provided by a tube) into two channels preferably of equal size, which are provided by two tubes, each of which is connected equally to the first tube. Owing to the profile of the channels or of the tubes, such a division is referred to as a Y division. In order to divide a feed line which runs along the longitudinal axis of the tube bundle reactor into two, four or eight channels with one entry hole each, the profiles of the divided tubes or lines are bent according to the arrangement of the entry holes. The resulting curvature of the lines of the Y divisions should be provided such that the radius of curvature in relation to the tube diameter of the lines is ≥2. The division may be in one stage, for example from one line to two lines which lead to the end holes, or may be in two or more stages, in which case a first division stage divides the feed line into two lines at first, which are in turn divided in a further stage again into two lines in each case. The number of lines in the last stage, i.e. in the stage connected to the entry holes, then comprises a number of lines according to $2^n$, where n is the number of stages and 2 represents the fact that two lines are fed from one line in each division. The number of lines of the last stage then corresponds to the number of entry holes, since exactly one entry hole is provided per line in the last stage and is supplied by that line.

This aspect of the feed channels, which is based on the tube bundle reactor, can equally be achieved by process steps based on a process according to the invention, wherein, in accordance with the invention, the division into a plurality of feed streams is achieved by conducting the reaction mixture or the reaction mixture conducted through a feed line through dividing tubes or lines. The conduction of the reactant mixture comprises the passing of the reactant mixture through a Y division which supplies two entry sites (which are adjacent to the entry holes) with reactant mixture (i.e. supplied reaction mixture), or which supplies a further Y division with reactant mixture. When a Y division supplies two entry sites with reactant mixture, the lines leading from the division to the entry site are lines of the last stage. When, in contrast, the lines of the Y division supply a further Y division, the former Y division belongs to a first stage or to a stage above the last stage.

According to the invention, not only the feed hood is configured with a flat design, but also the release hood into which the tube bundle conducts reaction mixture, and by means of which the reaction mixture is conducted out of the tube bundle reactor. In principle, feed hood and release hood or only one of these hoods may be configured according to the inventive flat design. The definitions of the flat design used here, which are defined for the feed hood, relate equally to the release hood, and the definitions given for the release hood relate equally to the feed hood. Whether feed hood, release hood or both hoods have an inventive flat design depends especially on the reaction and the reaction mixture. Preferably, however, the feed hood is configured according to the inventive flat design. A flat design is understood to mean not just the profile of the hood cover, but relates, according to the definitions used herein, more particularly to the design of the overall hood or the hood volume based on tube bundle volume or tube bundle cross section. For the design of the release hood and the corresponding components which are present therein or attached thereto, the same features and characteristics as described for the feed hood thus apply, the release hood being arranged as a mirror image to the feed hood. While the feed hood is attached at the feed end of the tube bundle, the release hood is attached at the release end of the tube bundle, which is at the opposite end to the feed end. Feed end and release end are the two end planes between which the tube bundle reactor extends longitudinally. Thus, the release hood is also configured in a flat design with a cross-sectional area at the release end and an internal volume, where the ratio of internal volume to cross-sectional area of the release hood is 0.35 m, or the release hood is configured in a flat design with a maximum distance between release hood and release end, and the ratio of maximum distance between release hood and release end to the cross-sectional area at the release end is ≤0.1 1/m. The release hood can be configured according to the specifications for the feed hood, this being especially true of the abovementioned geometric properties and ratios which were used to define the feed hood. More particularly, the release hood can be configured like the feed hood, the cross-sectional growth based on the cross-sectional area of the release end, the ratio of internal volume to cross-sectional area of the release hood and the ratio of maximum distance to cross-sectional area at the release end corresponding to the definitions of the design which have already been given above for the feed hood. The arrangement ratios are thus also defined on the basis of the symmetry to the tube bundle reactor; for definition of the release hood, the release end replaces the feed end of the tube bundle, the inner volume of the release hood replaces the inner volume of the feed hood, and the maximum distance between release hood and release end replaces the feed hood and the feed end. Equally, the cross-sectional area is covered at the release end or at the end of the release hood facing the tube bundle.

The features thus defined with reference to the release hood of the tube bundle reactor implement the invention, as do the following process steps which relate to the release of the product from the tube bundle. Accordingly, the process according to the invention comprises a step of releasing the product from the tube bundle, wherein the product, at a release end of the tube bundle at the opposite end to the feed end, is passed out of the tube bundle in the form of a fluid stream into an interior of a release hood of the tube bundle reactor. In this context, the fluid stream has, on exit from the release end, a cross-sectional area, and the interior of the release hood through which the fluid stream flows has an inner volume, where the ratio of inner volume of the release hood to the cross-sectional area of the fluid stream at the release end is ≤0.35 m. Alternatively or in combination therewith, the fluid stream at the release end has a cross-sectional area and a maximum distance between the fluid stream which is released from the release end and the feed end where the ratio of maximum distance to cross-sectional area is ≤0.1 1/m. As already noted, for configuration of the fluid stream or of the release hood which defines it, the descriptions and definitions for the feed hood should be used.

Like the feed hood too, the release hood is also preferably configured rotationally symmetrically to a longitudinal axis which corresponds to the longitudinal axis of the tube bundle. The feed hood, the release hood or both are either configured in one part or are configured in two or more parts, each component having a rotationally symmetric form. The internals which may be present in the hoods, i.e. the deflecting apparatus, the distributor plate and the homogenizing plate, are also preferably configured rotationally symmetrically to the longitudinal axis of the reactor.

With regard to thermal radiation, the feed hood may be uninsulated on the outside, in order thus to enable a cooling effect from the outside. However, it is preferred that the feed hood is thermally insulated and/or that the feed hood is connected to a heating or cooling system with heat transfer, in order to control or to regulate the temperature within the hood. The temperature control effect (cooling or heating) from the outside through the hood, owing to the small amount of reaction mixture in the feed hood, has a significant effect on the temperature of the mixture. The temperature of the reaction mixture within the feed hood is thus easier to control. The same also applies for a release hood configured in accordance with the invention, in which the release medium can be cooled, for example, to an uncritical temperature as soon as it leaves the tube bundle, in order to prevent further reactions. In addition to free thermal radiation, which is provided by dispensing with thermal insulation, it is also possible to arrange cooling coils on the outside of the feed hood or of the release hood. This prevents an uncontrolled temperature rise in the particular reactor hood. In general, the heat from the hood can be transferred to a cooling medium and removed via the outside of the hood. In addition to heat transfer through the hood wall, heat is also transferred from or to the reaction mixture within the hoods by the reactor base. Especially the reactor base at the feed hood removes a significant portion of the heat of reaction which arises in the feed hood. Any component which serves for heat removal can in principle also be used for heat supply, by virtue of the sign of the temperature difference between heating medium and reaction mixture being reversed through suitable selection of the temperature of the medium. Especially in the case of startup of the reactor, heat can also be supplied to the reaction mixture.

When the product mixture, after passing through the tube bundle, has substantially reacted to completion and the reaction conditions in the release hood are temperature-critical only to a small degree, the release hood can be constructed conventionally, i.e. with a curved hood, as known from the prior art. However, especially in the case of reactions which are performed only up to a partial conversion in the tube bundle, or in the case of thermally sensitive products or product mixtures, both hoods, i.e. the feed hood and the release hood, are configured according to the flat design. Both hoods may have the same configuration or may have a different configuration, in which case both hoods preferably correspond to the specifications described above.

Preferably, the feed hood and the release hood or only one thereof is removable, in order to enable unhindered access to the interior of the reaction tubes or to the feed end or release end of the tube bundle. To this end, the reactor hood is provided with elements, by means of which the hood can be mounted on the reactor wall by means of a screw connection, for example in the form of a flange. Tube bundles are considered to be at least two and up to 50 000 parallel reaction tubes, the ends of which are preferably each provided in one of two planes. The tube bundle may consist of identical tubes (for example same wall thickness and same internal cross section) or of different kinds of tubes, for example with tubes on the outside of the tube bundle which are larger (i.e. greater wall thickness, greater internal cross section or greater wall thickness with the same or lower internal cross section) than inner tubes. Tube bundles are considered especially to be reaction tubes whose number is at least 2, at least 5 or preferably between 1000 and 3000, preferably between 1500 and 2500, preferably 2400 or 1600. In principle, it is also possible, depending on the tube bundle diameter, the diameter of the individual tubes and the tube level, for even more tubes to form the tube bundle, for example more than 5000, more than 10 000, more than 20 000 or more than 30 000. Preferred external diameters of these tubes are diameters of 20-100 mm, preferably between 30 and 80 mm and especially between 40 and 55 mm. The tube pitch, which defines the mean distance between two adjacent tubes, is preferably between 30 and 100 mm, and especially between 50 and 70 mm. The end sides which are defined by these planes are referred to as the release end or as the feed end of the tube bundle. The release end is preferably arranged above the feed end, the tube bundle reactor preferably being vertical (i.e. along the line of gravity), and the release end is arranged vertically above the feed end.

The tube bundle reactor is preferably of the "shell-and-tube" design, the tube bundle reactor comprising a reactor wall which encompasses the tube bundle, and which has a cylindrical form at whose end sides are arranged the release hood and the feed hood. The release hood, the feed hood and the cylindrical reactor wall thus seal an interior completely, in which the tube bundle is present.

The reactor wall preferably has accesses for cooling medium, especially for water, or another temperature control medium with sufficient heat capacity, such as heat carrier oils or liquid salt mixtures. In addition, the cooling can be provided by evaporation of a liquid, especially of water, for which purpose a reservoir vessel for water is preferably attached on the reactor jacket, for example a steam drum. The temperature control medium flows through the space that the reactor jacket encompasses, from the release end to the feed end or vice versa, and thus entrains heat of reaction from the tube bundle. In order to promote the circulation of the temperature control medium, a pump may be provided, or natural circulation by convection may be provided, with which the heating medium circulates. In addition, preference is given to providing a heat sink to which the temperature control medium can release absorbed heat. In a similar manner, it is also possible to provide heat sources if they are needed to equalize the heat energy balance. These heat sources are preferably connected to the reactor in such a way that they heat the temperature control medium. The circulation rate of the temperature control medium and especially the external heat transfer coefficient (for example approx. 1000 W/m$^2$/K) is preferably selected such that a maximum difference of 10 K is provided between temperature control medium inlet and temperature control medium outlet.

By virtue of the small amounts of mixture outside the cooled tube bundle, which arise with the flat design of the hoods, essentially an isothermal state is provided within the overall reactor, such that a constant composition of the discharge from the reactor arises. Owing to the essentially constant composition of the discharge from the reactor, it is possible to make very fine regulation adjustments on the downstream processing apparatus, for example processing columns. This is a result of the precisely controlled operating parameters in the overall reactor, such as temperature and pressure. At the same time, the energy input in distillation plants used for processing can be minimized, which further likewise minimizes product loss in the case of discharge of undesired secondary components from individual process stages. The good regulability and the fast reaction time in the control of temperature which is achieved by the flat design of the hoods make it possible to achieve the effect that the maximum temperature within the tubes of the tube bundle is not more than 15 K and preferably not more than 6 K above the mean temperature of the cooling medium. In addition, thermocouples can be positioned on the tubes, preferably at an axial site, it being possible to provide the thermocouples in a thermal protection tube which has an external diameter of not more than one third of the internal diameter of the reaction tube. The maximum temperature within the tube is preferably determined with these thermocouples positioned axially within the tube, which may be accommodated in a thermal protection tube and which, owing to the low external diameter of the thermal protection tube, only insignificantly hinder the flow within the reaction tube.

In a further embodiment, some of the tubes or all tubes of the tube bundle may be empty, such that the interior of the tube is filled completely with reaction mixture. Alternatively, suitable random packings or structured packings can be provided within the reaction tubes, preferably random packings, in order to improve heat transfer within the tubes. More particularly, it is advantageous to provide random packings with a proportion of empty volume of at least 75% in the tubes, in order not to unnecessarily reduce the reaction space, for example when thin-wall Raschig rings are used. The random packings firstly allow improved heat transfer, and the proportion by volume of the random packings secondly reduces the volume concentration of the heat of reaction. As a result, the temperature can be controlled better even in the case of strongly exothermic reactions. The random packings used are preferably Raschig rings, or other random packings which define the flow within the tubes as desired and which may lead to an additional pressure difference between inlet and outlet of each tube. The random packings are configured such that they generate sufficient crossmixing, which increases the heat transfer. The random packings are preferably configured such that they occupy only a small volume (based on the inner volume of the tube). The random packings can effectively influence the flow. By virtue of the random packings, plug flow is preferably achieved instead of laminar flow. The pressure drop over the tube bundle is caused principally by the bed of random packings. Moreover, the random packings provide surfaces within the tubes past which reaction mixture flows directly, heat from the reaction mixture is transferred to the surface and the heat absorbed by the surface is transferred via the tube walls outward into the cooling medium which is conducted past the outsides of the tubes.

According to the invention, in the event of failure of the energy supply, the temperature control medium will flow out of the reservoir vessel owing to the hydraulic pressure in the jacket space of the reactor. Since the reservoir vessel is arranged in accordance with the invention such that the liquid level of the temperature control medium in the reservoir vessel is at least essentially at the same height as the liquid level in the outer space of the reactor, temperature control medium flows downward into the reactor, evaporates along the tubes owing to the heat absorbed, and the steam rises within the reactor. The steam which forms is withdrawn from the reactor in order to keep the pressure essentially constant, or in order to lower the temperature further. The evaporating water lowers the liquid level in the reactor, such that new temperature control medium is supplied from the reservoir vessel. In order to ensure that, even in the case of a completely flooded outer space of the reactor, sufficient temperature control medium flows in, it is also possible to arrange the reservoir vessel such that the liquid level in the reservoir vessel is always above the liquid level in the reactor.

Preferably, in the event of failure of the energy supply, the pressure in the jacket space of the reactor is lowered in a controlled manner. As a result of the lowered pressure in the jacket space, the boiling temperature of the temperature control medium also falls. In this way, the temperature in the tubes can be lowered. In the ideal case, it may even be possible to lower the temperature to one at which the reaction is ended.

As already mentioned above, the heat of reaction released in the reactor is removed by the temperature control medium. The product stream which leaves the reactor has a temperature which corresponds essentially to the reaction temperature. In principle, the stream, possibly after decompression, can be passed directly into the workup. However, it may be advantageous to use the latent heat of the product stream in order to heat one or more of the reactant streams. This is generally done in a separate heat exchanger. When, however, either the product stream or the reactant stream to be heated is thermally sensitive, it is advantageous to use a tube bundle heat exchanger whose hoods have the same design as the hoods of the inventive tube bundle reactor. In one embodiment, the hot product stream from the reactor is used in order to preheat one or more of the reactant streams supplied to the reactor in a heat exchanger.

In a particularly preferred embodiment, no separate heat exchanger is used for this purpose, and the heat exchanger is instead mounted directly on the output side of the reactor.

To produce the tube bundle, preference is given to using tubes which have an internal diameter of at least 30 mm and at most 150 mm. Particular preference is given to using tubes with an internal diameter in the range from 40 to 50 mm, for example of approx. 41.1 mm, for example with a wall thickness of 2-5 mm, preferably approx. 3.6 mm. In order to obtain sufficiently good heat transfer between the tube interior and the temperature control medium in the jacket space with simultaneously sufficient strength of the tubes, preference is given to using tubes with a wall thickness of 5-15 mm, especially with a wall thickness of 7-11 mm and, for example, a wall thickness of 8.5-9 mm. In one embodiment of the invention, which is suitable particularly for relatively high working pressure ranges, not all reaction tubes have the same wall thickness. More particularly, reaction tubes closer to the outside of the tube bundle are configured with a greater wall thickness than tubes closer to the longitudinal axis of the tube bundle. This achieves a higher pressure resistance without any need to provide the tube plates or the outer shell of the reactor in particularly thick sheet metal to withstand the stresses.

Within the reactor shell, an apparatus structure which holds the tubes and hence the tube bundle is preferably provided. In this case, the apparatus structure is preferably accommodated hanging freely within the reactor, such that the release hood and the feed hood, with which the reactor is sealed, are freely accessible.

The interior of the feed hood, i.e. the volume which extends between the inner surface of the feed hood and the feed end of the tube bundle, preferably has a height between 2 and 300 mm, preferably between 5 and 200 mm or between 10 and 50 mm. In this interior, a baffle plate is preferably mounted, such that the space between hood and tube plate, i.e. between hood and feed end, corresponds to a gap in terms of form. In this connection, gaps refer to volumes whose height is significantly less than their (average) diameter. The interior between feed end and hood base, i.e. the space enclosed by the inner side surface of the hood, the inside of the hood cover and the feed end of the tube bundle, is thus divided into two gaps which are connected to one another only via an outer ring gap. This gives rise to a hollow cylindrical form for the stream conducted past the baffle plate at the level of the baffle plate. The annular gap which connects the two divided interiors preferably has similar outer dimensions to the entire interior between feed end of the tube bundle and cover of the feed hood. The width of the annular gap, i.e. distance between circumference of the baffle plate and the opposite inner surface, corresponds to about the height of the interior, i.e. the (maximum) distance between feed end of the tube bundle and opposite inner surface of the feed hood. The width of the annular gap corresponds preferably to 0.05-5 times the distance between inner surface of the hood and feed end, and more preferably 0.08-0.8 times the distance between inner surface of the hood and opposite feed end of the tube bundle. The interior is thus preferably about as high as defined by the distance between the outer edge of the baffle plate and inside of the hood. The definition by means of a baffle plate given here is merely illustrative; in general, the baffle plate provides a deflecting apparatus which defines the fluid stream from the feeding into the hood until entry into the feed end of the tube bundle owing to the gap formation and the bisection of the interior within the feed hood. As already noted, the deflecting apparatus, and in the illustrative case the baffle plate, serves to homogenize the fluid stream fed to the tube bundle, and serves especially to feed the stream fed into the hood not directly into the feed end, which gives rise to inhomogeneities with regard to feed rate and pressure within the cross section of the tube bundle, but rather to convert the reaction mixture flowing in directly first into a significantly widening flow, such that the widened flow gives rise to a more homogeneous feed distribution at the feed end. Between deflecting apparatus (baffle plate) and feed end is arranged a perforated plate, i.e. a perforated metal sheet with which the flow can be homogenized still further once it has flowed around the deflecting apparatus.

In principle, internals can be provided in the interior of the feed hood, which distribute the reactants introduced into the feed hood homogeneously between the tubes of the tube bundle. In addition to a perforated plate or sieve trays, which are used as a homogenizing plate, it is also possible to use porous sintered plates through which the reaction mixture is conducted, and which likewise provide the homogenizing plate. The homogenizing plate is preferably configured such that it generates not just one defined pressure drop which is homogeneous in cross section, by providing flow resistance for the fluid flow, but rather that it can additionally serve as a support for bed material which is provided within the tubes. The perforated plates are therefore provided with reinforcements, with sufficient material thicknesses and/or with supports, which serve the purpose that the bed material within the tubes can be supported. In a particular embodiment, the perforated plate is preferably configured and aligned with respect to the tube bundle such that the perforated plate provides exactly one hole for each tube of the tube bundle, which can allow an additional space between homogenizing plate and feed end of the tube bundle to be dispensed with. In this case, the homogenizing plate in the form of the perforated sheet is arranged directly at the feed end of the tube bundle and has, by virtue of the correspondingly arranged holes aligned to the tube bundle, channels which supply the tubes of the tube bundle, all in the same way, with reaction mixture fed in. The perforated plates thus have exactly as many holes as tubes are provided in the tube bundle, the individual holes of the perforated plate being aligned exactly to the orifice of the particular tube. In other words, each hole of the perforated plate has a longitudinal axis which corresponds to the longitudinal axis of exactly one tube. If appropriate, the holes of the perforated plate can be offset slightly from the tubes, provided that it is ensured that the entire cross section of the hole of the perforated plate is within the cross section of the tube attached thereto. The hole diameter of the perforated plate is thus preferably somewhat less than the internal diameter of the tubes, and is preferably less than 90%, 80%, 70%, 60%, 50% or 30% of the internal diameter of the tubes. In a particular embodiment, guide plates are also used, which are provided between perforated plate and tube, and by which an impinging fluid jet is divided into individual streams or fluid jets. More particularly, it is also possible to use ring distributors in order to conduct the fluid stream from the homogenizing plate to the feed end of the tube bundle.

In a further embodiment of the tube bundle reactor, it is connected to a heat exchanger which is attached directly to the release hood. In the same way, the process according to the invention is preferably provided with an additional process step, according to which the product or product mixture conducted out of the release hood is fed to a heat exchanger, the feeding being provided by a direct connection between heat exchanger and release hood. In further embodiments, the tube bundle reactor comprises a heat exchanger or a heat source to preheat reactant streams, for which purpose the heat exchanger or the heat source is attached directly to the feed hood, or is provided in a feed line which leads to the feed hood. In the same way, the process according to the invention preferably comprises the step of heating the reactant mixture fed in or reaction mixture to the feed hood, the heating being provided by a heat exchanger or a heat source.

In a further preferred embodiment, the release hood is connected to a feed of the feed hood either indirectly via a heat exchanger or further components, or directly, for example via a pump, such that at least a portion of the product or product mixture is recycled. The recycling connection may comprise, as well as a pump, also a heat exchanger or a heat source, in order to suitably control the temperature of the product mixture. The process according to the invention thus further accordingly comprises a step of recycling product or product mixture from the release hood indirectly or directly to the feed hood, preference being given to mixing the recycled mixture with a reactant stream before it is fed into the feed hood, and the resulting mixture being fed into the feed hood. The conversion of individual reactants can thus be controlled more precisely, especially when the reactant mixture or the reaction mixture comprises components which do not react fully in the course of one pass through the tube bundle. During the recycling, the product stream can also be processed further, for example by distilling, before the recycled product stream or the recycled product mixture is mixed with reactants, or before the recycled product mixture is fed into the feed hood. To this end, a processing apparatus, for example a distillation apparatus, is preferably introduced into the recycle line, which provides a return connection from the release hood to the feed hood.

Instead of heating by means of a heat exchanger or of a heat source, the product stream or product mixture stream conducted out of the release hood can be cooled by means of a cooling apparatus or by means of a heat exchanger. The connecting line which connects the feed hood to the release hood (indirectly or directly) can thus also be provided with a cooling device, for example a cooling unit or a heat exchanger.

The invention relates to a process for performing uncatalyzed or homogeneously catalyzed reactions, in which thermally sensitive reactants and/or products may be involved, using the inventive tube bundle reactors. More particularly, the inventive tube bundle reactor and the inventive process are suitable for reactions which have thermally sensitive reactants or products, for example in reactions in which undesired conversion products form from products. In addition, the invention is suitable for reactions which have to proceed within a narrow temperature window or pressure window. The invention is also suitable for reactions which also proceed outside the reactor, i.e. reactions without catalyst and reactions with catalyst distributed homogeneously in the reactant stream or in the reaction mixture. This is the case especially for reactions which have significant evolution of heat or which absorb heat, in particular in the case of such reactions which are to proceed within a particular, narrow temperature window.

Suitable uncatalyzed reactions are, for example, oxidations with oxygen, air or dinitrogen monoxide, or diels-alder reactions. Useful homogeneously catalyzed reactions include, for example, oxidations, carbonylations, hydroformylations, hydrogenations, metathesis reactions, hydrocyanations of monoolefins and nonconjugated or conjugated polyolefins, oxidations of hydrocarbons, additions of nucleophiles, for example water, alcohols, ammonia, primary and secondary amines and mercaptans, onto epoxides, aziridines or thiiranes, addition of $CO_2$, COS or $CS_2$ onto epoxides, aziridines, thiiranes, homogeneously catalyzed hydrogenations of olefins, carbonyl compounds or imines, homogeneously catalyzed oligo- or polymerization of olefins, epoxides, aziridines, oligo- or polycondensations of di- or polyols with di- or polycarboxylic acids or derivatives thereof, di- or polyamines with di- or polycarboxylic acids or derivatives thereof, di- or polyols with di- or polyisocyanates, di- or polyols with di- or polycarbodiimides.

Monoolefins and nonconjugated or conjugated polyolefins as starting compounds can form oligomers and polymers in an exothermic reaction in the event of an uncontrolled temperature increase. However, other unsaturated systems, for example compounds with unsaturated carbon-nitrogen bonds, also tend to oligomerize or polymerize. One example is hydrogen cyanide, which serves as a $C_1$ unit in hydrocyanations and can polymerize in an exothermic reaction.

The inventive tube bundle reactor and the inventive process are suitable especially for the preparation of cyclododeca-4,8-dienone, which can be converted by subsequent hydrogenation to cyclododecanone. In order to synthesize cyclododeca-4,8-dienone, 1,5,9-cyclododecatriene and dinitrogen monoxide are fed as reactants to the tube bundle reactor. The reaction mixture within the reactor comprises these reactants.

The reaction which is performed in the preparation of cyclododeca-4,8-dienone by reaction of 1,5,9-cyclododecatriene with dinitrogen monoxide is suitable for performing the invention and is described in WO 05/030690 and WO 08/000,756. More particularly, the inventive tube bundle reactor is suitable for this reaction.

The reaction of 1,5,9-cyclododecatriene with dinitrogen monoxide is performed in the absence of catalysts in the liquid phase.

In the context of the present invention, it is possible in principle to react any cyclododecatriene or any mixture of two or more different cyclododecatrienes with dinitrogen monoxide. Useful examples here include 1,5,9-cyclododecatrienes, for example cis,trans,trans-1,5,9-cyclododecatriene or cis,cis,trans-1,5,9-cyclododecatriene or all-trans-1,5,9-cyclododecatriene, or mixtures thereof. The reactant mixture may further comprise isomers thereof, or else impurities or additives.

The dinitrogen monoxide used for the reaction may in principle be used in pure form or in the form of a suitable gas mixture comprising dinitrogen monoxide. More particularly, the gas mixture used may be the gas mixture described in WO 05/030690, which comprises dinitrogen monoxide.

Cyclododecatriene is a thermally sensitive compound which already decomposes noticeably in an exothermic reaction in the temperature range of the cyclododecatriene conversion. The temperature in the feedline, i.e. in the feed channels, and in the feed hood is therefore kept between 190° C. and 205° C. In other words, the temperature is controlled in such a way that the mixture, before entry into the tube bundle or into the feed end, is between 190° C. and 205° C. These temperatures must not rise even in the case of a fault, for example in the event of power failure. Under these conditions, cyclododecatriene already reacts with dinitrogen monoxide in the mixers, the feedline and the lower hood. A temperature rise is, however, prevented by not insulating the mixers and the reactor feedline, and thus promoting the heat removal by conduction, convection and radiation. For safety reasons, however, mixer and feedline are protected and thus thermally insulated, and so the heat is dissipated essentially via tube plates and also via the hood. In addition, in accordance with the invention, only a small volume is provided for the reaction mixture within the feed hood. In other words, the temperature control is enabled or facilitated in accordance with the invention by a small height of the feed hood or by a small internal volume or by the significant cross-sectional growth of the feed hood in the direction of the tube bundle.

The reaction of cyclododecatriene with dinitrogen monoxide in the tube bundle reactor to give cyclododecadienone and nitrogen is effected at 230° C. to 270° C., preferably 240° C. to 260° C., more preferably 240° C. to 250° C. The temperature control which is achieved by heat exchangers and/or by the heating medium within the reactor shell is set up in accordance with the invention to achieve these temperature ranges in operation. The pressure at these temperatures is 50 to 100 bar, preferably 70 to 100 bar, more preferably 90 to 100 bar, within the tubes of the tube bundle reactor and also preferably in the hoods.

In one aspect of the invention, the tube bundle reactor is operated in such a way that the molar ratio of cyclododecatriene to dinitrogen monoxide in the reactor feed of the tube bundle reactor is: essentially 10 to 1, preferably essentially 8 to 1, and more preferably essentially 7 to 1. The associated dinitrogen monoxide conversion is 80 to 100%, preferably 90 to 100%, more preferably 95 to 100%. As a result, the cyclododecatriene fed in is converted to an extent of 10 to 30%, preferably 12 to 25%, more preferably 14 to 20%.

The cyclododecadienone target product can react further with further dinitrogen monoxide to give diketones. This reaction can be at least partly prevented by the invention, by virtue of the inventive tube bundle reactor and the inventive process enabling only a low scatter of the temperature within the reactor. More particularly, this is enabled by an inventive release hood which, by virtue of the small amount within the feed hood, allows more efficient and more effective cooling or temperature control, which avoids conversion products. The use of tubular reactors in combination with high cyclododecanone/dinitrogen monoxide molar ratios achieved cyclododecadienone selectivities of up to 95%.

Further advantages of the inventive flat reactor hoods are that, in the oxidation of cyclododecatriene with dinitrogen monoxide to cyclododecadienone with formation of oxygen, in which the thermally sensitive cyclododecatriene is decomposed exothermically in the feed hood, the decomposition which occurs to an enhanced degree in the event of faults such as power failure, is greatly reduced compared to known reactor designs. For this purpose, the flat reactor hoods ensure good dissipation of the heat of reaction, since the inventive flat design, owing to the advantageous surface/volume ratio within the hood(s) (especially within the feed hood), leads to a stable and safe mode of operation, even in the event of faults in the fluid flow within the reactor.

The reaction tubes are cooled with water or another cooling medium which circulates in the jacket space of the reactor. The feed is heated in the tubes which form the flow channels. In addition, the reaction mixture fed in or parts thereof can be heated to reaction temperature, before it is fed to the reactor via the hood. The heat of reaction absorbed by the cooling water is used, for example, to produce steam, which can be used at other points in the process or be fed into a steam supply grid.

The reaction output of the tube bundle reactor, which is released from the release hood or from any heat exchanger connected directly thereto, is cooled and worked up by distillation to give pure cyclododecadienone. The unconverted cyclododecatriene obtained is, like the fresh cyclododecatriene, preheated, preferably by heat exchange with the reaction output which is released from the release hood, and fed via a recycle line to a mixing apparatus in the reactant inflow. The heat exchange is preferably implemented by a heat exchanger which couples the mixture of the release hood or the mixture of any heat exchanger attached directly thereto with heat transfer with the mixture introduced into the feed hood. For this purpose, the heat exchanger has a first circuit which is connected to the recycle line or to the release hood, and a second circuit which is connected to the feed of fresh reactants into the release hood. Alternatively, the heat exchanger may couple the feed hood, the fresh reactant feedline, a feed mixer or a combination thereof to the release hood with heat transfer, and be connected correspondingly thereto.

The invention further relates to compounds prepared in the inventive tubular reactors, especially cyclododecanone, which has been prepared by means of the inventive process from cyclododecatrienes.

DETAILED DESCRIPTION OF THE DRAWINGS

Figure 1A:
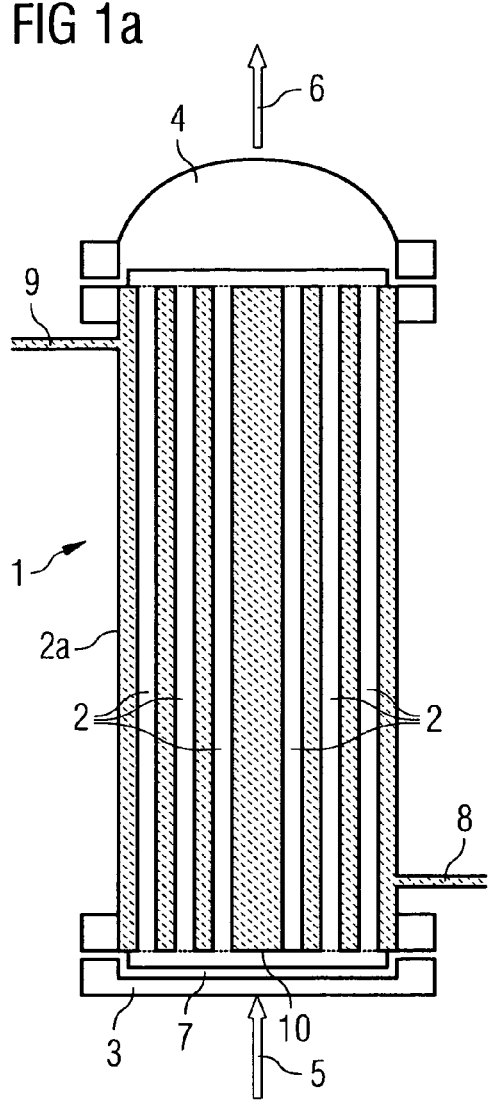
FIGS. 1a and 1b show the general structure of two embodiments of the inventive tube bundle reactor.

FIG. 1a shows an inventive tube bundle reactor 1 with a multitude of parallel reaction tubes which run between two ends of the tube bundle. The reaction tubes 2 form the tube bundle of the tube bundle reactor. Reaction mixture is provided within the tubes during operation. A reactor wall 2a encompasses the tube bundle around the entire circumference and thus encloses the tube bundle. The spaces provided between the tubes of the tube bundle and between the tube bundle and the reactor wall are connected to one another, and a cooling medium or temperature control medium flows through them during operation. In FIG. 1a, the reaction medium is shown by hatching. The tube bundle reactor further comprises an entry-side hood, i.e. a feed hood 3, at which a reactant stream 5 enters the tube bundle reactor from below. In this case, the tube bundle reactor is preferably oriented such that the feed hood, with regard to the field of gravity, is provided at the lowermost point of the tube bundle reactor, and the tube bundle reactor is aligned vertically upright in relation to the earth's field of gravity. In an alternative embodiment, which is not shown in FIG. 1, the orientation of the reactor can be reversed with regard to the field of gravity, with a reactant stream entering from the top, which leaves again at a lower release hood. The reaction mixture fed in, see arrow 5, is introduced via the feed hood 3 into the tube bundle 2, i.e. into the interior of the tubes of the tube bundle 2, and passes through the tube bundle in the upward direction, in order to exit at an exit-side hood or in the internal volume thereof, the exit-side hood providing the release hood 4. The release hood is thus connected to the tube bundle 2, in order to take up the reaction mixture flowing through it there, and to a product outflow 6, through which reaction mixture which has passed through the tube bundle leaves the tube bundle reactor.

While the release hood 4 has a large-volume form customary in the prior art, the feed hood 3 is configured with a very small volume, based on the cross section, and hence in an inventive flat design. At the feed end 10 of the tube bundle, at which a tube plate is provided in order to support the tube bundle, a narrow gap 7 is provided, by which the internal volume of the feed hood is defined. It is immediately evident from FIG. 1 that the volume of the feed hood is many times smaller than the volume of the release hood 4, even though both have the same cross section.

It can be estimated directly from FIG. 1a that, in the case of an exothermic reaction within the hoods and in the case of a (hypothetical) identical starting position within the release hood 4, a significantly stronger "hotspot" would arise than in the feed hood 3. In the feed hood 3, a temperature rise can therefore only occur to a limited degree, since incoming reaction mixture almost immediately, without intermediate storage, enters the tube bundle, where the temperature can be controlled efficiently by heat removal and supply. It is directly evident that, in the case of a design as provided by the release hood 4, which is configured according to the prior art, incoming reaction mixture first resides for a period within the hood, and thus a significantly greater amount of heat or temperature evolves, which can be removed only poorly, as a result of which the heat also accumulates, for example in the form of a hotspot.

According to the invention, the reactor wall 2a has a cylindrical, preferably circular cylindrical, configuration and comprises, at an upper end, i.e. at a release end, which faces the release hood 4, a coolant outlet which is in contact with the interior of the reactor and hence with the space which surrounds the tube bundle. In the same way, a coolant feed 8 is provided, which is arranged close to the feed hood 3, and thus at the feed end 10. As already noted, a tube plate is provided at the feed end 10 and seals the tubes with respect to one another, and thus completely separates the space between the tubes within the reactor wall from the space within the tube bundle, within the feed hood 3 and within the release hood 4. This separation affects, however, only fluid flows, such that coolant (hatched) and reaction mixture remain separate, whereas the large heat exchange area which is provided essentially by the outer surfaces of the reaction tubes of the tube bundle 2 enables good heat transfer between temperature control medium and reaction mixture. In addition to a tube plate 10 provided at the feed end, a further tube plate is provided at a release end of the tube bundle, which is opposite the feed end. The tube plates serve to support the tubes and if appropriate to retain components provided within the tubes, such as mixing elements, internals, heat transfer elements and the like. If appropriate, catalysts can also be provided within the tube bundle, which are held in their position by the tube plates. It is also evident from FIG. 1a that the two hoods 3 and 4 have peripheral connecting elements which correspond according to the connecting elements of the reactor wall at the feed end 10 and at the opposite release end. At the feed end and at the release end, it is thus possible to connect the reactor wall 2a or the end side thereof with the open end of the particular hood with sealing. Even though FIG. 1a should not be considered as a scale diagram either with regard to wall thickness or with regard to the geometries, it is evident that the feed hood 3, owing to the flat form, is equipped with a significantly greater wall thickness than the release hood 4, since the flat form of the release hood 3 leads to stronger transverse forces within the hood than the hood form of the release hood 4. In the embodiment shown in FIG. 1a, the inner end side and the opposite outer end side of the feed hood each extend along a plane which is at right angles to the longitudinal axis of the tube bundle reactor. For the gap 7, which provides the internal volume of the feed hood, this gives rise to a disk form, i.e. a circular cylindrical form with low height compared to the diameter.

Figure 1B:
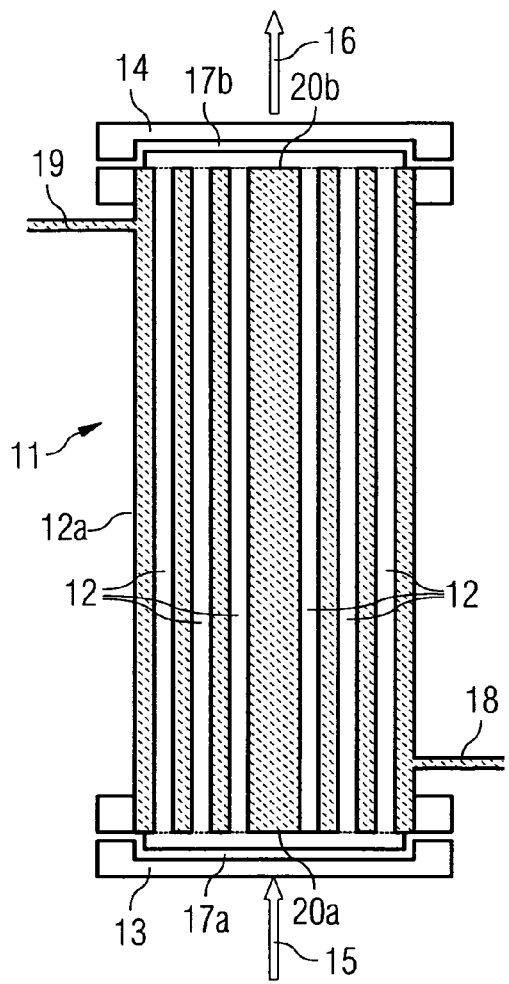

FIG. 1b shows the general construction of a further embodiment of the inventive tube bundle reactor 11 with reaction tubes 12 which form the tube bundle, which is in turn completely surrounded by a reactor wall 12a. The tube bundle reactor 11 further comprises a feed hood 13 which is configured like the feed hood of FIG. 1a, and an inflowing fluid stream 15 and an outflowing fluid stream 16, which removes the reaction mixture, which has been at least partly converted within the tube bundle, via a release hood 14 of the tube bundle reactor. In contrast to the embodiment of FIG. 1a, the release hood 14 is likewise provided in an inventive flat design. This gives rise to a small internal volume in the form of a narrow gap between the end surface of the internal volume of the feed hood 13 which faces away from the tube bundle reactor and a feed end 20a of the tube bundle, the inner surface of the release hood 14 likewise providing, with a release end 20b of the tube bundle, a narrow gap 17b which constitutes the internal volume of the release hood 14. This also gives rise to a very short residence time of mixture within the release hood at the release end of the tube bundle reactor of FIG. 1b. This is important especially in the case of thermally sensitive reaction mixtures, the high ratio of surface area to internal volume of the release hood 14 additionally enabling good radiation of heat through the outside of the release hood 14. In other words, compared to the prior art (cf. release hood of FIG. 1a), in the case of the tube bundle reactor of FIG. 1b the product mixture which leaves the tube bundle reactor is also conducted out of the reactor immediately, without residing over a prolonged period at elevated temperature within the release hood. By virtue of the short residence time, the formation of hotspots is suppressed. As already noted, the residence time is critical especially in the case of thermally sensitive products, since an increased level of undesired conversion products and conversion reactions can occur as a result.

Like the reactor of FIG. 1a too, the reactor of FIG. 1b exhibits securing elements for securing the hoods 13, 14 on the reactor wall 2a. As also in FIG. 1a, in the reactor shown in FIG. 1b, a flange connection is selected in order to enable a pressure-resistant sealing connection between hood wall and reactor wall 2a. Just like the reactor shown in FIG. 1a, the reactor shown in FIG. 1b comprises a coolant inlet 18 and a coolant outlet 19, in order to flush coolant, which is in contact with the tube bundle, through the reactor and hence to at least partly remove the heat of reaction from the tube bundle. In an alternative embodiment which is not shown, the coolant inlet 18 shown here serves as the coolant outlet, and the coolant outlet 19 shown here serves as the coolant inlet. In principle, both cocurrent and countercurrent flow of the coolant are possible in accordance with the invention.

Even though FIG. 1b is not a true-to-scale representation of a reactor type either, it is evident that the ratio of surface area to internal volume of individual tubes of the tube bundle comes close to the surface/internal volume ratio of the hoods 14 and 13, preference being given to providing similar surface/volume ratios. According to the invention, the surface/volume ratio of the feed hood and/or of the release hood corresponds to at least 30%, at least 50%, at least 70% or at least 100% of the surface/volume ratio of the reaction tubes or of individual reaction tubes of the tube bundle 12. This is achieved by the low height dimensions of the gaps 17a and 17b, which determine the internal volume of the feed hood 13 and of the release hood 14, and thus likewise the surface/volume ratio. The surface of the hoods which is relevant for the thermal radiation is determined essentially by the outer end surfaces of the hoods 13 and 14, each of which runs along a plane which is at right angles to the longitudinal axis of the tube bundle. This surface area is in turn essentially determined by the diameter of the tube bundle or of the reactor wall, wherein the outer end surfaces of the hoods 13 and 14 are defined by the cross section of the reactor wall at the respective ends of the reactor bundle including an edge for the flange connection for fixing the hoods to the reactor wall 2a. The tube plate in particular serves to remove the heat of reaction to the reactor wall, to the hood and especially into the coolant within the tube bundle.

The reactor of FIG. 1b further comprises, like the reactor of FIG. 1a too, tube plates which are provided at the feed end 20a and at the release end 20b of the tube bundle, in order to separate the interior of the reactor wall 12a, i.e. the space in which the cooling medium is provided, from the particular interior of the hoods 13 and 14.

Figure 2:
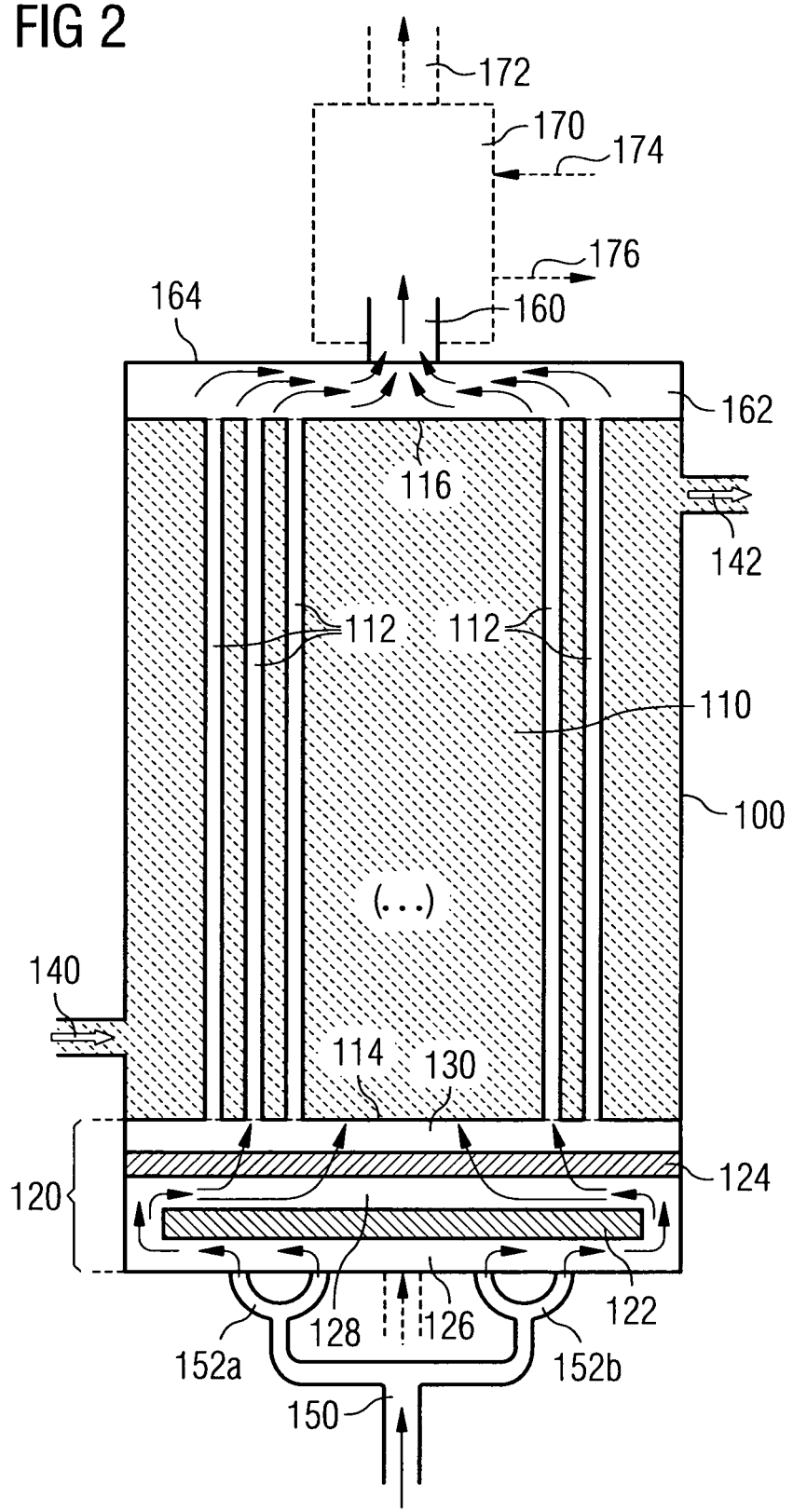
FIG. 2 shows a further inventive tube bundle reactor in detail.

FIG. 2 shows a further embodiment of the tube bundle reactor with further details within the feed hood.

The tube bundle reactor shown schematically in FIG. 2 comprises a reactor wall 100 which is shown in cylindrical form. Like further features of the reactor too, the reactor wall 100, without specification of the wall thickness, is characterized only with a single line along its course. The reactor wall 100 encompasses a tube bundle 110 which comprises individual tubes 112. The tubes 112 extend between a feed end 114 and a release end 116. The tube ends of all tubes are thus provided aligned with one another, such that all tube ends are within the same plane at the feed end, and all tube ends are within the same plane at the release end. The planes each extend at right angles to the longitudinal axis of the tube bundle reactor or at right angles to the direction of extension of the tubes. The tube bundle reactor further comprises a feed hood 120 shown in more detail, and coolant connections 140, 142 arranged on the side walls, which comprise a coolant inflow 140 and a coolant outflow 142. The two coolant connections are preferably arranged close to opposite ends of the tube bundle, in order not to provide any preferential flow which leaves out sections of the tube bundle.

In addition, for better distribution of the coolant within the reactor wall, internals can be provided, in order to conduct, to mix and/or to swirl the coolant. The feed hood 120 comprises feed channels 150, 152a, b, which are explained in detail in the next section. The feed channels are connected at the entry sites to the end side of the feed hood 120, which is arranged opposite the feed end 114 of the tube bundle. The reaction mixture or reactant mixture flowing into the interior of the feed hood 120 first hits, within the interior, a deflecting apparatus which comprises, in the embodiment of FIG. 2, a distributor plate 122 (here in the form of a baffle plate) and a homogenizing plate 124. The distributor plate 122 is provided between the entry holes of the feed hood 120 and the homogenizing plate 124, the homogenizing plate 124 being arranged between the deflecting plate 122 and the feed end 114 of the tube bundle. Both extend concentrically within the internal volume of the feed hood 120. The distributor plate 122 deflects the fluid stream fed in first from an axial direction to a radially outward direction, a side of the distributor plate 122 facing the entry holes defining the direction along which the flow runs outward to the circumference of the distributor plate 122. Between the outer circumference of the distributor plate which widens the cross-sectional extent of the fluid stream and the feed hood 120 is provided a gap which directs the fluid stream fed in again in an axial direction. The axial direction of the fluid stream is defined by the axial profile of the outer circumference of the distributor plate, and by the cylindrical profile of the inner wall of the feed hood at the level of the distributor plate 122.

The interior is thus divided in axial direction by the distributor plate. Between distributor plate 122 and homogenizing plate 124 is provided a further gap which extends in axial direction, and which leaves open a space for the fluid flow, which extends radially over the entire cross section of the feed hood 120. The fluid flow can thus collect over the entire cross-sectional area of the hood, which was previously restricted at the level of the distributor plate to the annular cross section of the channel provided there. In order to homogenize the distribution of the flow (with regard to pressure and flowrate) over the entire cross section, the homogenizing plate 124 provides a multitude of axial channels which run along the longitudinal axis of the tube bundle reactor. The individual holes in the homogenizing plate 124 serve to generate a defined pressure drop for each tube and hence to guarantee the homogeneous distribution. In order to ensure this homogeneous distribution, the gap between homogenizing plate 124 and feed end 114 of the tube bundle may have suitable dimensions and, in a preferred embodiment, its thickness may approximate to zero (not shown in FIG. 2), such that the feed end 114 essentially directly adjoins or is in contact with the side of the homogenizing plate facing the tube bundle.

Figure 3:
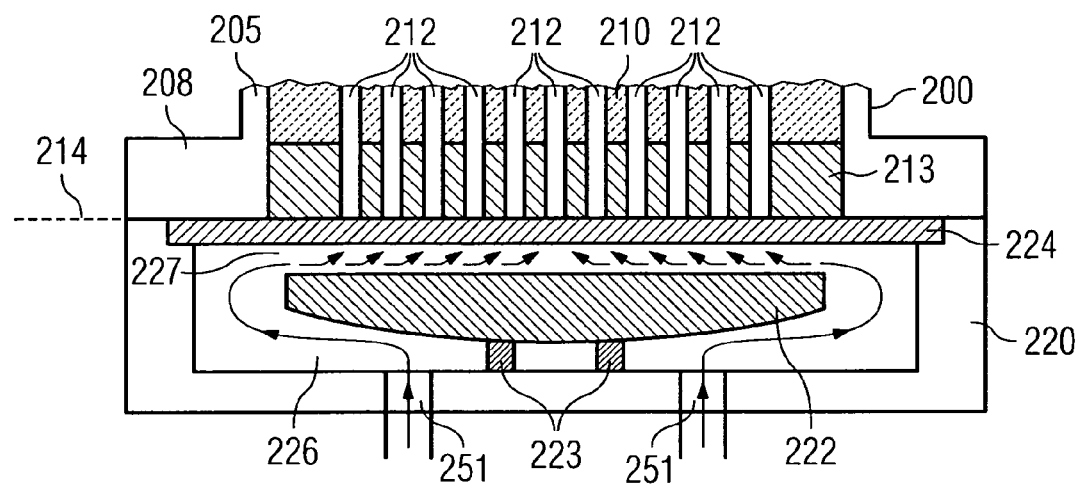
FIGS. 3 and 4 show details of the feed hood of the inventive reactor.

In a controlled manner, the channels provide a flow resistance which generates, in the intermediate space between homogenizing plate 124 and distributor plate 122, a (minor) backup in which the fluid fed in can be distributed. This is especially true of fluids which are present as the liquid phase. A further (optional) intermediate space is provided between the homogenizing plate 124 and the feed end 114 of the tube bundle 110, by virtue of the individual flows leaving the homogenizing plate being able to influence one another, thus making it possible for homogenization to occur. This intermediate space can be dispensed with completely, as shown in FIG. 3, in which case the homogenizing plate directly adjoins the feed end of the tube bundle. While the distributor plate 122 is configured homogeneously and does not enable any flow in axial direction, for example in the form of a baffle plate, the homogenizing plate is provided as a perforated metal sheet, the perforations providing the individual axial channels which generate a controlled flow resistance.

The tube bundle reactor shown in FIG. 2 further comprises a tube plate which is not shown in FIG. 2 and which firstly serves as a holder for the tubes 112 and secondly to separate the interior of the feed hood and the interior of the reactor wall in which the temperature control medium is provided. In FIG. 2, the tube plate forms the lower conclusion of the tube bundle, which ends in the tube plate. The feed end of the tube bundle thus lies within the tube plate and concludes therewith. The tube plate separates the space of the reactor which surrounds the tube bundle from the feed hood 120.

The feeding of the fluid stream is provided by a plurality of feed streams, which are provided by the individual feed channels 150, 152a, b and the corresponding Y divisions. The feeding shown in FIG. 2 comprises dividing tubes which are divided by means of the Y divisions 150, 152a, b into a multitude of entry sites provided at particular entry holes of the feed hood.

FIG. 2 shows a two-stage division by means of Y divisions, in which an individual feed stream is first divided at the Y division 150 into two feed channels of equal size, the divided channels each being divided in turn by further Y divisions 152a, b of the next stage into further feed channels. The radius of curvature at the Y divisions of the feed channels is at least twice as great as the tube cross section of the tubes connected thereto.

After passing through the homogenizing plate 124 and through the gap between homogenizing plate and feed end, which can also be dispensed with, the reaction mixture flows through the tubes 112 of the tube bundle 110, in order to emerge at the opposite end of the tube bundle, the release end 116. The gap is preferably dispensed with (corresponds to a thickness of zero) or is less than 5‰, 2‰, 1‰, 0.5‰, 0.1‰ or 0.05‰ of the external diameter of the tube bundle. FIG. 2 shows the gap in enlarged form and for the purpose that the individual functional elements of the apparatus are better distinguishable from one another. At the release end 116, the reaction mixture from the tubes enters an internal volume 162, before the mixture enters a release connection 160. The internal volume 162 at the release end of the tube bundle is defined by the inside of the release hood 164, of which FIG. 2 shows merely the inner outlines, as the feed hood 120 is also shown only by the inner outlines of the tube bundle reactor which are relevant for the fluid flow. The release hood 124 is bound in a fluid-tight manner to the reactor wall or the reactor jacket 100, which fully encompasses the tube bundle 110. The release hood thus has the same diameter as the reactor wall at the release end of the tube bundle; the same applies to the feed hood 120, which has the same internal cross section as the reactor wall at the feed end 114 of the tube bundle 110. The fluid-tight connection of the release hood to the tube bundle is preferably provided by virtue of the end of the hood facing the tube bundle directly adjoining the reactor base (not shown) and being connected thereto in a fluid-tight manner. The reactor base extends in radial direction completely up to the reactor wall or up to the end of the hood facing the tube bundle, and concludes the tube plate completely. The release hood 164 has a function complementary to the feed hood 120, i.e. the bundling of the fluid flow which emerges from the release end 116 of the tube bundle 110, in order to feed it to a release connection 160 with lower cross section in bundled form. The complementary function of the feed hood is to widen the (bundled) fluid stream fed in and spread it or distribute it homogeneously to the feed end 114 of the tube bundle 110. In FIG. 2, the height of the interior of the release hood 164 is less than the height of the interior of the feed hood 120. Preference is given, however, to identical designs for the feed hood and the release hood, configuration features mentioned for the feed hood also applying to the release hood and vice versa. However, in a further aspect of the invention, the release hood 164 can also be equipped with a smaller height than the feed hood 120, since the feed hood 120 includes or encompasses a deflecting apparatus, and the release hood 164 has an empty interior 162 between hood cover and release end 160. The release end 160 may conclude with a release-side tube plate (not shown). The tube bundle opens at or into the tube plate (not shown), the tube plate separating the intermediate space between the tubes and the tube bundle from the interior 162 of the release hood 164. The (empty) interior 162 of the release hood 164 is then concluded in a fluid-tight manner by the tube plate, which also concludes with sealing with the reactor wall and the release hood 164, and the inner wall of the release hood 164.

The release connection 160 can be connected to a line which conducts the product mixture to a further processing stage or a filling apparatus. In one aspect of the invention, however, a heat exchanger 170 is attached directly to the release connection 160, which is shown with broken lines in FIG. 2. Between heat exchanger 170 and release hood 164, preferably only a very short connection is thus provided, which is, for example, smaller than the radius of the tube bundle or smaller than 75%, 50%, 25%, 10% or 5% of the radius of the tube bundle. The product mixture released by the release connection 160 is fed to the heat exchanger 170 and cooled there, and emerges again (in cooled or temperature-controlled form) at the release of the heat exchanger 172.

For temperature control, the heat exchanger preferably likewise comprises tube bundles or cooling coils, which serve to separate the product mixture from the temperature control medium, but which simultaneously enable good heat transfer from the product mixture to the temperature control medium. To this end, the heat exchanger 170 comprises an inlet 174 and an outlet 176, the inlet 174 introducing cooling medium into the interior of the heat exchanger 170, and (in the case of product mixture to be cooled) passing heated temperature control medium out of the reactor 170 through the outlet 176. Depending on the reaction conditions, it is also possible to preheat the reactant mixture or reaction mixture fed in upstream of the heat exchanger. For this purpose, the heat exchanger uses the latent heat of the output in order to preheat mixture fed to the reactor and simultaneously to cool the reactor output. This thermal coupling is achieved by appropriate heat-transferring connections that the heat exchanger provides, which connect reactor feed and reactor release to the heat transfer, supported by the heat exchanger. The release connection 160 is preferably configured such that the medium already, by virtue of particular exit sites in the hood, suitably enters the tube bundle of the heat exchanger 170, the exit sites of the release hood corresponding to the product mixture feed sites of the tube bundle reactor.

FIG. 2 is not a true-to-scale representation. Especially the dimensions of the feed hood, of the release hood and of the plates present in the feed hood are not drawn to scale, but rather are extended along the longitudinal axis of the reactor, such that the profile of the fluid flow is easily discernible.

FIG. 3 shows the detail of a feed hood and adjoining feed end of the tube bundle of an inventive tube bundle reactor in detail. The feed hood 220 is connected to the tube bundle reactor 200 and thus to the tube bundle 210 which comprises a number of tubes 212. All tubes end at the same plane, which constitutes the feed end 214 of the tube bundle reactor. At the feed end of the tube bundle 210, the feed-side tube plate 213 is arranged, in which the tube bundle 210 ends or opens. The tubes 212 are attached to orifices of the tube plate or extend at least partly into it, in order to provide a fluid-tight seal of the tube interior from feed hood and the intermediate space which extends between the tubes 212. In the direction of the feed hood 220, the reactor wall 205 opens out into a securing apparatus 208 with which a flange can be formed, by means of which the feed hood 220 is bonded to the reactor wall 205. The reactor base 213 is also connected to this securing apparatus 208 in a fluid-tight manner. In FIG. 3, the reactor wall 205 and especially the securing element 208 conclude with the plane 214, in which the feed end of the tube bundle 214 and an outer end side of the reactor base 213 also lie. The opposite inner end side of the reactor base 213 faces the space between the tubes 212. In this plane 214, the feed hood or the end side facing the feed end abuts the reactor wall and especially the connecting apparatus 208 of the reactor wall 205. The tubes 212 are held by the tube plate 213 which has channels corresponding to the tubes 212, into which they are inserted or to which the tubes 212 are bonded in another way, as a result of which the tube plate 213 holds the tubes 212. The tube plate 213 is bonded to the reactor wall 205 in a mechanically stable and fluid-tight manner on the inside of the reactor wall 205. The tube plate provided with channels concludes with the feed end 214 of the tube bundle 210.

In an alternative embodiment which is not shown, the tube plate (and also the exit-side tube plate which is not shown in FIG. 3) and a portion of the securing apparatus are configured as a flange, the part of the securing apparatus of the tube plate together with the tube plate being configured as a single bulk steel plate with channels or bores for the tubes. The tube plate is then, just like the reactor wall, configured at the feed end with a part of the securing apparatus, the parts of the securing apparatus distributed between the tube plate and the reactor wall constituting a flange connection which possesses, for example, fixing screws.

In an alternative embodiment which is not shown, the feed end of the tube bundle reactor and the tube plate 213 are offset in the upward direction, i.e. offset by a certain distance from the end side of the feed hood facing the feed end, which gives rise to an additional volume. Since the volume is provided between reaction mixture feed and feed end of the tube bundle, it is considered to be part of the internal volume of the feed hood. The offsetting of the feed end of the tube bundle gives rise to a further gap between a homogenizing plate 224 and the feed end of the tube bundle 214. In FIG. 2, such a gap is indicated with the reference numeral 130. In a particularly preferred embodiment, the homogenizing plate, however, directly abuts the feed-side tube plate without forming a significant gap, as shown in FIG. 3.

In the embodiment shown in FIG. 3, the homogenizing plate 214, which is configured as a perforated sheet whose channels align with the channels of the perforated sheet directly adjoins the feed end of the tube bundle 214 and as a result likewise has direct contact to the tube plate 213 which concludes with the feed end 214, the ends of the tubes extending through the entire tube plate. Alternatively, the tube bundle can extend only into an (upper) part of the tube plate, the channels of the tube plate forming the fluid connection to the feed hood and the feed end of the tube bundle thus being extended up to the plane 214 (which is adjoined by the homogenizing plate). The homogenizing plate 224 is configured as a perforated sheet which has a multitude of channels running in longitudinal direction of the tube bundle, which provide a certain flow resistance. This gives rise to a controlled (small) backup which homogenizes the flow rates over the cross section and over all tubes of the tube bundle. The homogenizing plate is inserted into a peripheral groove of the feed hood 220, such that bonding of the feed hood 220 with the connecting elements 208 of the reactor wall likewise fixes the homogenizing sheet 224. The perforation holes of the homogenizing plate 224 may be significantly smaller than the cross section of the individual tubes 212, such that an individual tube receives the flows of a multitude of perforation holes of the homogenizing plate 224. Alternatively, the homogenizing plate 224 may have holes which are each assigned individually to particular tubes, such that exactly one perforation hole provides the reaction mixture for exactly one assigned tube. The cross-sectional area of the perforation holes in the homogenizing plate 224 in this case is preferably smaller than the internal cross-sectional area of the individual tubes.

The feed hood 220 also has a distributor plate 222 which, in contrast to the homogenizing plate, has no channels, and instead a continuous cross section. The distributor plate 222 is secured with connecting elements 223 on the inside of the end surface of the feed hood 220, which is arranged opposite the feed end 214. As already described in FIG. 2, reaction mixture enters the interior of the feed hood 220 at entry sites 251 and hits a surface of the distributor plate 222 there, which conducts the fluid stream of the reaction mixture radially outward. In FIG. 3, this surface is not shown as a flat surface, as envisaged in FIG. 2, but rather is envisaged as a concave surface inclined toward the tube bundle. The surface that the fluid stream fed in hits may in principle have any form, but is preferably flat or has another form desired for fluid conduction. The distributor plate 222 thus provides a first gap between the feed-side end surface of the internal volume of the feed hood 220, in which the fluid stream fed in is widened. This gap 226 in which the fluid stream is widened ensures especially that incoming reaction mixture does not preferentially enter particular tubes and other tubes are not charged with a lower flow. For this reason, the distributor and hence the surface that the fluid stream fed in hits extends over the cross section of the feed end. The cross section of the feed end refers to the cross section of the tube bundle at the feed end, or the inscribed circle which surrounds the tube bundle. Between distributor plate 222 and homogenizing plate 224 is provided a further gap 227 in which there is free flow through the internal volume, and which thus serves to collect the spread fluid stream. Since a certain volume is provided between distributor plate and homogenizing plate 224 by the gap 227, and the homogenizing plate 224 forms a certain backup, the reaction mixture collects in gap 227 over the entire cross section of the internal volume, especially over the cross section of the tube bundle, and enables equalization of pressure, which leads to homogenization of the flow within the cross-sectional gap 227. The gap 227 thus serves as a collecting space for the reaction mixture before it enters the feed end 214 in a homogenized manner. In addition, the gap 227 serves as an accumulating space for the backup or the pressure difference which is provided by the homogenizing plate 224.

Figure 4:
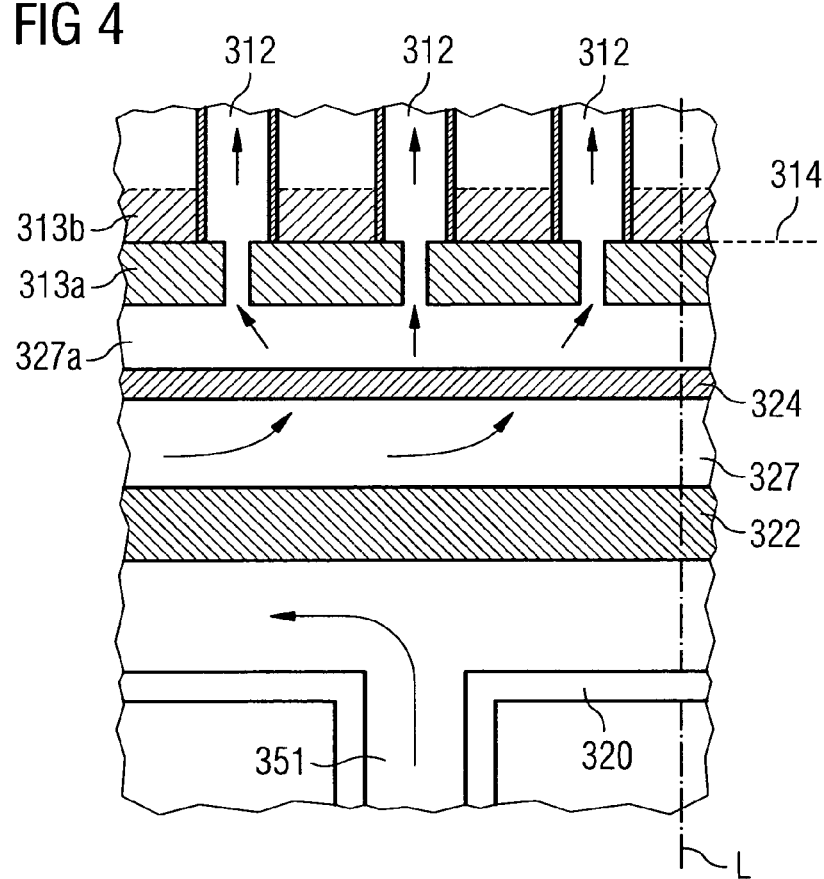

FIG. 4 shows a section of the tube bundle reactor with a feed hood 320 and the feed end 314 of the tube bundle, of which 3 tubes 312 are shown by way of example. The hood comprises, on the end side facing away from the feed end, a feed 351 through which reaction mixture enters the interior of the feed hood 320. The feed 351 is offset from the longitudinal axis L and is thus provided outside the center of the reactor hood. Owing to the further excentric feeds which are not shown, the stream fed in is deflected radially outward by the distributor plate 322 which is provided within the feed hood 320. Between outer edge (not shown) of the distributor plate 322 and the inside of the feed hood is provided an annular channel which deflects the reaction mixture in axial direction again and deflects it into a gap 327 between the distributor plate 322 and a homogenizing plate 324 within the feed hood. As already noted, the homogenizing plate 324, in contrast to the distributor plate 322, is equipped with (axial) channels, for example in the form of a perforated sheet or else in the form of a sintered plate. In general, the channels within the homogenizing plates are equipped in such a way that they connect the two end sides of the homogenizing plate to one another. The specific profile of the channel within the homogenizing plate can be selected freely, and can especially be eliminated in order to provide the suitable flow conditions and the suitable flow resistance. The optional homogenizing plate has a gap 327a which serves for better illustration, and can also be dispensed with when, in a preferred embodiment, the homogenizing plate 324 directly abuts a tube plate 313. The tubes 312 are inserted into the tube plate 313. In FIG. 4, tubes 312 are inserted into a first section 312b of the tube plate, and a second section 312a provides channels for fluid connection of the tubes to the interior of the feed hood. The second section 313a of the tube plate has channels with a cross section which is less than the internal cross section of the tubes. As a result, the second section 313a too, like the homogenizing plate 324 too, forms a backup action for the incoming reaction mixture, and forms a kind of restrictor for the tubes of the tube bundle. The homogenizing plate 324 is thus optional and can be omitted; the channel cross section in the second section 312a can be provided according to the desired flow conditions. The first section 312b thus serves to hold the tubes of the tube bundle, while the second section 312a serves to form feed channels for the reaction mixture, in order to feed reaction mixture to the tube bundle, and to narrow the flow cross section in this feedline in a controlled manner. The first section 312b can be formed in one piece with the second section 312a, or the two sections may have a two-part form. In the case of a two-part configuration, the sections are connected to one another directly or via a holder arrangement or via the reactor jacket.

In an embodiment which is not shown, the channel cross section of the second section (312a) is as large as the cross section of the first section (312b); in this case, preference is given to using a homogenizing plate which more preferably directly adjoins the tube plate. In this embodiment, there is no difference between the two sections and both are configured like the first section 313b. In other words, in this embodiment, the channels have a constant cross section, the tubes penetrating the complete tube plate and preferably concluding with the side of the tube plate facing the feed hood. The feed end then corresponds to the plane which runs along this side. The tube plate is bonded to the tubes of the tube bundle by means of press fitting, by means of weld bonds, or preferably by means of both. In this embodiment, the section of the tube plate which, together with the corresponding tube end sections, forms the channels for feeding the reaction mixture to the tube bundle, also serves to hold the tubes. These two functions are, in contrast, in the configuration of FIG. 4, divided into sections 313a and 313b. The embodiment which is not shown is preferably combined with a homogenizing plate. This homogenizing plate immediately adjoins the feed plane.

Again with reference to the embodiment in FIG. 4, a homogenizing plate is likewise arranged on the tube plate there, and is indicated with reference numeral 324. While the distributor plate 322 does not abut the side of the feed hood 320 or the side wall thereof or conclude therewith, the homogenizing plate 324 is equipped such that it is bonded to the feed hood with sealing or at least covers all tube accesses. There is thus no significant flow outside the homogenizing plate or at the outer edge of the homogenizing plate. All of the mixture fed in is passed through the channels of the homogenizing plate 324. Owing to the pores or channels of the homogenizing plate 324, a flow resistance thus arises, with which all of the fluid flow is charged as it passes through the homogenizing plate 324. This gives rise to a controlled backup in the gap 327, which serves for pressure equalization along the cross section of the feed hood within the gap 327. Between the homogenizing plate 324 and a feed sheet 313a may be provided a further gap 327a which serves to further homogenize the fluid flow which leaves the homogenizing plate 324 before it enters the tubes 312 of the tube bundle. Preferably, however, the gap is not present or is significantly smaller than one diameter of a channel of the tube plate or than one internal diameter of a tube of the tube bundle. The second section 313a of the tube plate comprises channels adjoined by individual tubes. More particularly, the second section 313a comprises, for each tube, exactly one channel which is aligned with the internal cross section of the tube. The internal cross section of the tube thus completely encompasses the cross section of the channel of the second section 313a at the feed end 314 of the tube bundle.

Alternatively or in combination therewith, the first section 313b of the tube plate is provided, into which the ends of the tubes 312 are admitted. The tube plate is thus bonded to the tubes with sealing, the first section 313b and hence also the channels in section 313a being bonded to one another and to the tubes 312 with sealing, and thus extending the effective feed end up to the underside (facing the feed hood) of the reactor base. This can be achieved by the weight with which the tube bundle presses on the tube plates 313a, b, preferably including a press fit and/or a weld bond between tube and reactor base. The tube bundle reactor is therefore preferably aligned such that the longitudinal axis L corresponds to the direction of gravity and the feed hood constitutes the lower end of the tube bundle reactor. The tube plate 313a serves firstly to support the tube bundle and also serves, if appropriate, as a holder for bodies provided in the tubes, for example heat release bodies or catalyst bodies. Heat release bodies are preferably provided in the tube bundle, especially when the tube bundle reactor is operated with homogeneously distributed catalyst or without catalyst. Especially in the case of exogenic or strongly exogenic reaction types, the heat release bodies provided in the tubes serve to reduce the reaction volume, i.e. the volume in which reaction mixture is present within the tube bundle, and simultaneously to remove the heat of reaction which arises, by virtue of the reaction mixture being conducted past the heat release bodies and the heat release bodies, by contact with the inner walls of the tubes 312 or by securing with the inner walls of the tubes 312, being able to release the heat to the tube walls and hence to the temperature control medium which is conducted around the outer tube walls of the tubes 312. This firstly reduces the heat of reaction generated based on the corresponding volume, by virtue of the heat release bodies occupying space in which no reaction takes place, and the heat of reaction is secondly removed additionally since the reaction mixture releases heat of reaction not just via the tubes but also via the heat release bodies or the surface thereof. More particularly, in a steady state, the back mixing of the flow is increased in a controlled manner, which gives rise to a desired flow rate distribution over the flow cross section. The back mixing increases the external heat transfer. In the event of faults, for example pump failure in the reaction mixture circuit (power failure), the shaped bodies absorb a large amount of heat owing to the high heat capacity and prevent undesirably strong heating of the reaction mixture which arises through lack of heat removal (owing to increased residence time). The cross section of the channels or passages within the tube plate 313a, b is preferably provided such that it is smaller than the smallest cross section of the heat release bodies, in order to prevent the heat release bodies from getting through the tube plate 313a, b into the feed hood 320. For this purpose, a sieve may also be arranged on the tube bundle, which retains the heat release bodies in the tube bundle. The function of the sieve can be achieved by the homogenizing plate, which then preferably directly adjoins the feed end of the tube bundle or the tube plate. Instead of heat release elements or in combination therewith, it is possible to provide catalyst bodies within the tubes, in order to provide additional catalyst surface for the reaction mixture. Raschig rings may be provided as heat release bodies in the tubes. In addition, the tube bundle may have, at the feed end, restrictor elements to reduce the internal cross section of the tubes. These have the same purpose as a homogenizing plate and the thinner channels in the second section 313a. Since the heat release bodies, as well as heat-based effects, especially cause flow effects (mixing) and artificially reduce the volume in the tubes in a controlled manner, the heat release bodies can also be referred to as mixing bodies or as placeholder bodies.

Figure 5:
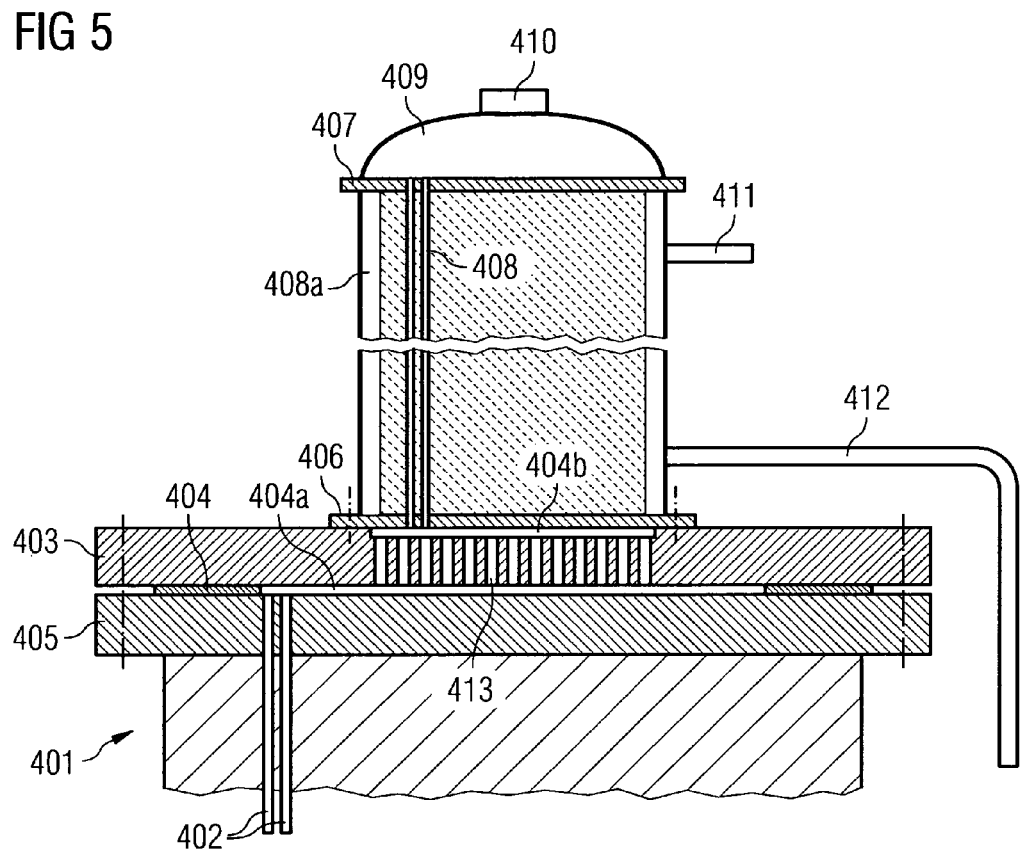
FIG. 5 shows a release hood of an inventive tube bundle reactor with attached heat exchanger.

FIG. 5 shows the release end of an inventive tube bundle reactor in detail with a heat exchanger. FIG. 5 shows the upper end of a tube bundle reactor 401 on the release side. Tubes 402 of the tube bundle of the tube bundle reactor are shown by way of example. The tube bundle reactor comprises a release hood which is formed by the end side of the tube plate 405 into which the tubes 402 are admitted, the ring 404 and the hood section 403. These may be configured in one piece (not shown) or may, as shown, be configured in two pieces and bonded to one another. The hood section 403 forms, together with the ring 404, a narrow gap 404a into which the tubes 402 introduce the product mixture. The tube plate 405 of the reactor on the exit side of the reactor is bonded via a flange connection to the ring and the hood section 403. The flange connection also comprises a screw connection (not shown), the extension of which is shown with dotted lines on the edges of the hood section 403 and of the tube plate 405. The reactor shown in FIG. 5 further comprises connecting bores 413 which connect the gap 404a to a gap 404b, which is formed between the end side of the hood section facing away from the reactor, and a tube plate 406 of a heat exchanger. The entry-side tube plate 405 is bonded via flange connections to the hood section 403, the extension of the corresponding screw connections being shown in dotted lines on the outer edges of the entry-side tube plate of the heat exchanger.

The heat exchanger comprises heat exchange tubes 408, of which only 2 are shown by way of example in FIG. 5. Via the entry-side tube plate 406 of the heat exchanger, into which the heat exchange tubes are admitted, the product mixture released from the reactor enters the heat exchange tubes 408. The tube bundle formed by the heat exchange tubes 408 is arranged within a heat exchanger jacket 408a, in which temperature control fluid, i.e. a medium for heat, of a temperature control circuit is present. The heat exchanger thus comprises an inlet 411 of a secondary cooling circuit and an outlet 412 of a secondary cooling circuit which is connected to a primary cooling circuit which passes through the heat exchange tubes 408. In order to achieve countercurrent operation, the inlet 411 is arranged at the far end of the heat exchanger from the release hood, and the outlet 412 is arranged at the release hood end of the heat exchanger. In a particularly preferred embodiment, a reactant stream is passed through the inlet 411 of the secondary cooling circuit, exits from the outlet 412 of the secondary cooling circuit and is conducted to the feed hood of the reactor 401. This provides heat exchange between the reaction mixture which is introduced into the feed hood, and the fluid mixture which is released from the release hood. In a further embodiment, not the entire reactant stream is passed through the secondary cooling circuit, but instead a regulable proportion, the temperature control of the overall reaction process being regulated by the control of the proportion of the reactant stream which is conducted through the secondary cooling circuit, based on the proportion which is introduced directly into the feed hood. It is thus possible to preheat the reactant stream 411 (at the inlet 411), which, for example, is provided cold, in which case the outlet of the preheated reactant stream 412 (at the outlet 412) is connected to the feed of the reactor directly or, for example, via a mixer.

The heat exchanger of the reactor of FIG. 5 further comprises a further tube plate which is provided on the exit side of the heat exchanger. To this is connected an exit-side hood 409 of the heat exchanger in which the product stream or the product mixture which was conducted through the heat exchange tubes 408 is collected. To the exit-side hood of the heat exchanger 409 is connected an outlet for the cooled product 410, from which the cooled product stream exits and can be fed, for example, to a further processing stage or to a filling apparatus. The heat exchanger shown in FIG. 5 thus ensures the heat transfer from product stream to the reactant stream, in which case heat of reaction present in the product stream is released to the reactant stream in order to preheat it. The preheating firstly achieves a lower temperature gradient within the reactor, and the reaction mixture to be fed to the reactor is secondarily already brought to a suitable operating point. The early removal of the heat of reaction directly at the release end of the reactor by the heat exchanger also has the advantage that the product mixture is cooled to less critical temperatures immediately on exit from the reactor. If, as in the case of the reaction of cyclododecatriene with dinitrogen monoxide, the mixture exiting from the reactor comprises substances with undesired further reactions, the cooling can achieve the effect that undesired further reactions in the release hood are essentially suppressed as a result of the small internal volume of the release hood, and further reactions in the mixture stream released are suppressed by virtue of it being cooled immediately after exit from the release hood by the heat exchanger provided there. Moreover, the construction shown in FIG. 5, in which the entry-side tube plate of the heat exchanger directly adjoins the hood section 403, achieves rapid cooling of the exiting product stream, since the hood section 403 is cooled by the entry-side tube plate of the heat exchanger 406. Thus, a further reaction occurs only to a limited degree even within the connecting bores 413, since temperature control or cooling is already effected there by means of the heat exchanger. As already noted, instead of the cooling by means of cold reactant stream supplied, it is also possible to introduce a temperature control medium into the heat exchanger via the secondary cooling circuit when the reactants are already present in preheated form and are thus unsuitable for sufficient cooling.

The inventive process, in which the product mixture leaving the reactor is cooled directly, preferably by thermal coupling with cool reactant mixture, as in the apparatus of FIG. 5, in which the heat exchanger which provides the cooling is provided directly on the release hood, is suitable especially for reactions in which a reactant mixture comprises at least one component which is not converted fully, and which can still cause further reactions even after passing through the tube bundle of the reactor. This is the case especially in the reaction of cyclododecatriene with dinitrogen monoxide in the tube bundle reactor, in which the cyclododecatriene is not converted fully within the reaction mixture, for example only to an extent of 30% or less. The remaining cyclododecatriene remains within the product stream as a result of the incomplete conversion and can cause further reactions, especially at relatively high temperatures, which reduce the selectivity of the target product significantly. When, however, in accordance with the invention, the exiting product mixture is cooled immediately, these further reactions are reduced significantly. Moreover, the cyclododecadienone target product which is present in the product mixture can react further with further dinitrogen monoxide to give diketones, which likewise reduces the selectivity. Since this undesired reaction is temperature-dependent, it can be substantially suppressed by the direct cooling of the exiting product mixture. Especially in the case of reaction of cyclododecatriene with dinitrogen monoxide to give cyclododecadienone and nitrogen, it is possible to reduce undesired side reactions, further reactions and undesired products by precise temperature control in the feed hood, in the release hood and in the downstream product flow regime. This is achieved by a small volume within the feed hood, within the release hood, and by the direct cooling of the product stream released from the reactor. This restricts the reaction essentially to the tube bundle, such that only very small amounts of mixture are present outside the tube bundle (i.e. within the feed hood, the release hood, and within the product stream released), which has a different operating point and may generate undesired conversion products especially as a result of the heat of reaction which arises.

The reaction mixture in the feed hood, in the tube bundle and preferably also in the release hood is preferably present in the liquid phase or with a minor proportion in the gas phase. More particularly, the reaction mixture in the feed hood and in the tube bundle is present essentially in liquid phase, whereas the reaction mixture within the release hood is present in the liquid phase and with a maximum proportion of 20%, 10%, 5%, 2%, 1%, 0.5% or 0.1% of the reactor volume (=hood volume+volume of the tube bundle) in the gas phase. In this context, gas completely dissolved in liquid and liquefied gas mixture shall also be considered to be liquid phase.

Figure 6:
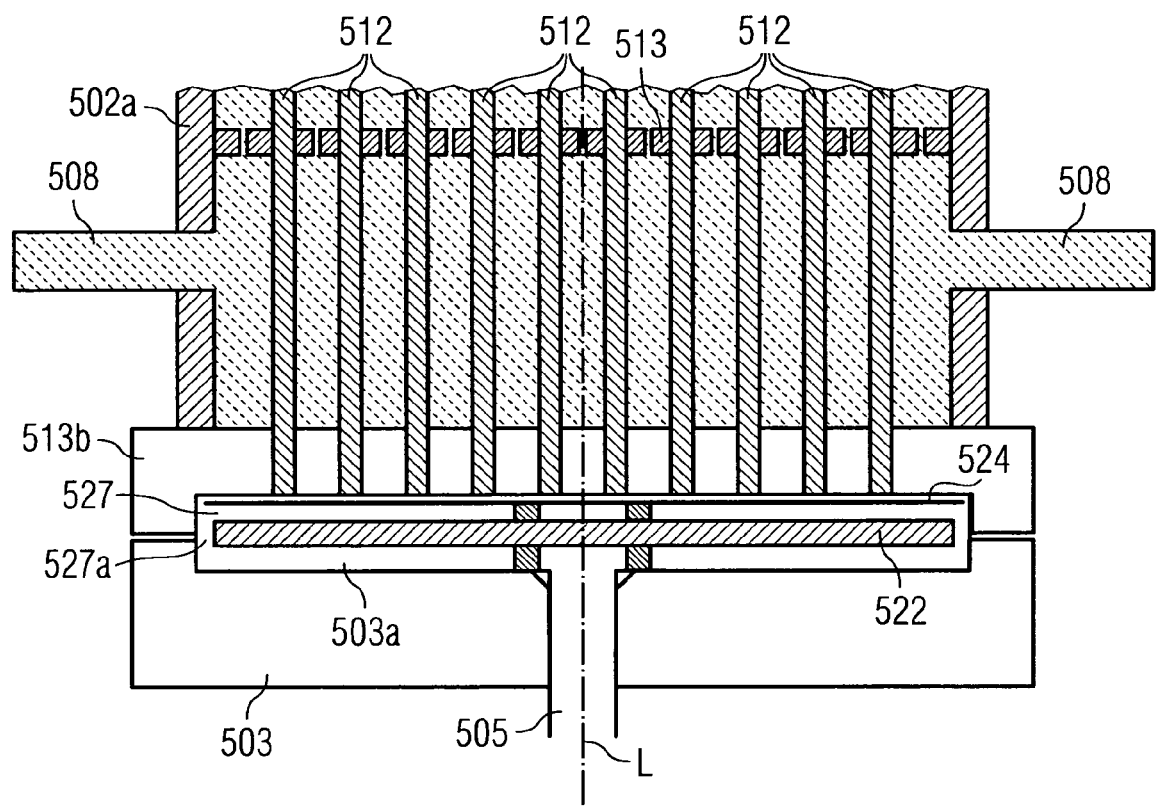
FIG. 6 shows the inventive feed hood and parts of the attached tube bundle reactor of a further embodiment of the invention.

FIG. 6 shows a further embodiment of the inventive tube bundle reactor, which shows the feed side in detail. The tube bundle reactor comprises a feed hood 503 with a feed 505 which runs along the longitudinal axis L of the reactor. The reactor further comprises a tube plate 513$b$ into which the tubes 512 of the tube bundle are admitted. Together with the feed hood 503, the tube plate 513$b$ thus forms an interior 503$a$ of the feed hood. The interior is considered to be the entire space between feed end of the tubes 512 and the opposite inner end surface of the reactor hood 503. A portion of the internal volume is thus provided by the reactor base 513$b$, which comprises a ring extending toward the release hood, the internal cross section of which contributes to the interior. Within the interior, moreover, a deflecting apparatus is provided, which comprises a distributor plate 522 and a homogenizing sheet 524. This provides three gaps, each of which has an empty, complete cross section which extends over the entire interior. The gaps are provided between distributor plate 522 and inner end side of the release hood 503, which is opposite the feed end of the tubes. A further gap which is continuous over the entire cross section is provided between distributor plate 522 and homogenizing plate 524, the third gap being provided between homogenizing plate and end side of the tube bundle, i.e. between the homogenizing plate 524 and the feed end of the tubes 512. At the level of the distributor plate 522, the cross section is defined to a narrow gap provided between outer edge of the distributor plate 522 and inside of the distributor hood.

The mixture flowing into the inflow 505 is thus passed radially outward through the first gap between distributor plate 522 and inner end side of the reactor hood 503, passes through the annular gap between inner wall of the feed hood and outer edge of the distributor plate 522, such that the fluid stream has the form of a ring which has a narrow edge before the mixture enters the gap between distributor plate 522 and homogenizing plate 524. In this gap, the fluid stream collects again over the entire cross-sectional area, such that the fluid stream has a cross section which corresponds to a circle in the form of the interior cross section. The gap between distributor plate and homogenizing plate 527 serves to homogeneously distribute the flow, since the homogenizing plate 524 backs up the flow in a controlled manner. The annular gap 527$a$ between distributor plate and inner wall of the feed hood 503 serves to spread out the flow cross section proceeding from the flow cross section in the feed 505. The feed hood further comprises securing elements which connect the distributor plate 512 to the inner end side of the feed hood 503 opposite the feed end of the tubes 512, the securing elements also fixing the homogenizing plate to the distributor plate 522 with a certain distance, in order thus to define the height of the gap 527, the connection to the feed hood 503 also securing the homogenizing plate 524 on the feed hood. Preferably, no gap is provided between homogenizing plate and inner side wall of the feed hood 503, although, in other embodiments, a small gap may be provided, which, however, is smaller than the width of the gap 527$a$ and preferably less than 50%, 30%, 20% or 10% of the gap width of the annular gap 527$a$ which is provided between outer edge of the distributor plate 522 and inner side wall of the feed hood.

The embodiment of the inventive tube bundle reactor shown in FIG. 6 further comprises inlet stubs 508 for cooling water, preferably stubs arranged around the circumference of the reactor wall 502$a$, close to the feed end of the tubes 512, in order to supply temperature control medium to the interior of the reactor. The reactor further comprises, on the release side, identical stubs (not shown) which serve to release the temperature control medium from the interior of the reactor. The reactor further comprises a perforated sheet 513 through which the tubes 512 extend, and which further comprises axial channels provided between the tubes, through which the temperature control medium is conducted toward the release end and especially to the release stubs (not shown).

In a preferred embodiment, the reactor comprises approx. 2500 or approx. 1600 tubes. The gap 527 between distributor plate 522 and homogenizing plate 524 has, according to an example, a height of 25 mm±4 mm, and the channel between the distributor plate 522 and the inner end side of the feed hood 503 at the feed 505 has a height of 25 mm and a diameter of 700 mm or 550 mm. The interior 503$a$ is preferably configured as a circular cylinder with a longitudinal axis which corresponds to the longitudinal axis L of the tube bundle reactor. The distributor plate 522 has a thickness of 30 mm, the distance between outer edge of the distributor plate 522 and the inner side wall of the feed hood 503 being 15 mm. This gives rise, at the level of the distributor plate, to a flow cross section in the form of a hollow cylinder with a length of 30 mm and a thickness (=radial distance between inner and outer cylinder) of 15 mm.

The invention claimed is:

1. A tube bundle reactor comprising a tube bundle which has a feed end which is connected to a feed hood of the tube bundle reactor, wherein the feed hood is configured in a flat design with a cross-sectional area at the feed end and an internal volume, and the ratio of internal volume to cross-sectional area is less than 0.35 m, wherein the flat design comprises a cross-sectional area growth of at least 1%/mm and wherein a ratio of a maximum distance between an internal surface of the feed hood and the feed end of tube bundles to the cross-sectional area is 0.15 1/m.

2. The tube bundle reactor according to claim 1, wherein at least a section of the internal volume of the feed hood arranged at the feed end is configured in the form of a cylinder, of a circular cylinder, of a hollow cylinder or of a hollow cylinder with circular internal and external cross sections.

3. The tube bundle reactor according to claim 1, wherein a deflecting device arranged between a feed connection of the feed hood and the feed end of the tube bundle is provided within the internal volume of the feed hood, in order to deflect at least portions of a fluid stream flowing from the feed connection into the feed hood radially outward before the fluid stream enters the feed end.

4. The tube bundle reactor according to claim 1 comprising a deflecting device, wherein the deflecting device comprises a distributor plate whose cross section is less than that of the internal volume at the feed end, in order to form a channel which runs within the internal volume at the outer edge of the plate in axial direction of the plate and around the outer edge of the distributor plate, and the deflecting device also comprises a homogenizing plate with a multitude of channels running through it, the homogenizing plate being arranged between the distributor plate and the feed end, and the distributor plate spatially dividing an empty section of the internal volume between the feed connection and the homogenizing plate.

5. The tube bundle reactor according to claim 1 comprising a distributor device, wherein the distributor device extends between the feed end of the tube bundle and the feed connection of the feed hood, and covers the entire feed end with respect to the fluid stream flowing out of the feed connection, in order to cover the feed end essentially completely with respect to a direct axial fluid flow from the feed connection by deflecting the fluid stream.

6. The tube bundle reactor according to claim 1, further comprising a plurality of feed channels which supply a plurality of entry holes which are provided in a wall of the feed hood and lead into the inner volume, at least one entry hole being arranged outside a central axis of the feed end, or all entry holes being arranged homogeneously around the central axis along a circle or within a ring.

7. The tube bundle reactor according to claim 6, wherein the entry holes are offset from longitudinal axes of tubes of the tube bundle reactor and the middle of each entry hole has the maximum distance from the closest longitudinal axes of the tubes.

8. The tube bundle reactor according to claim 1 comprising feed channels, wherein the feed channels are provided by dividing tubes which comprise a Y division which is attached to two of the entry holes or which is attached to a further Y division.

9. The tube bundle reactor according to claim 1, wherein the tube bundle has a release end which is at the opposite end to the feed end and is connected to a release hood of the tube bundle reactor, the release hood being configured in a flat design with a cross-sectional area at the release end and an internal volume, and the ratio of internal volume to cross-sectional area of the release end is less than 0.35 m.

10. A process for operating the tube bundle reactor of claim 1, comprising: introducing a reactant mixture into a tube bundle and converting at least a proportion of the reactant mixture within the tube bundle to a product, wherein the introducing comprises: feeding the reactant mixture into an interior of a feed hood of the tube bundle reactor and passing the reactant mixture on into a feed end of the tube bundle in the form of a fluid stream, the fluid stream having a cross-sectional area on entry into the feed end and the interior of the feed hood through which the fluid stream flows having an internal volume; and the ratio of internal volume to cross-sectional area being less than 0.35 m, wherein the flat design comprises a cross-sectional area growth of at least 1%/mm and wherein a ratio of a maximum distance between an internal surface of the feed hood and the feed end of tube bundles to the cross-sectional area is 0.15 1/m.

11. The process according to claim 10, wherein the introducing step comprises: introducing the fluid stream with a constant cross-sectional area; and the passing-on of the fluid stream within the feed hood comprises: spreading application of the fluid stream introduced; deflecting the spread fluid stream toward the feed end; conducting the deflected fluid stream in the form of a hollow cylinder, and combining the fluid stream to give a combined fluid stream with a constant cross section; and introducing the combined fluid stream into the feed end of the tube bundle.

12. The process according to claim 10, wherein a combined fluid stream in introduced into the feed end of the tube bundle, further comprising: conducting the combined fluid stream through a multitude of channels of a homogenizing plate which is arranged at the feed end.

13. The process according to claim 10, wherein the fluid stream is spread and deflected, and wherein the deflected fluid stream provided in the form of a hollow cylinder has an internal cross section which corresponds to the internal cross section of the hollow cylinder, and within which essentially no flow is provided, and the internal cross section of the deflected fluid stream covers essentially the entire cross section of the feed end with respect to the fluid stream introduced.

14. The process according to claim 10, wherein the feeding of the reactant mixture comprises: dividing a feed stream of the reactant mixture into a plurality of feed streams which are each conducted through one of a plurality of channels before the feed streams enter the interior at entry sites into the interior spaced apart, and at least one entry site or all entry sites are outside the central axis of the feed end of the tube bundle, or all entry sites are arranged homogeneously around the central axis of the feed end of the tube bundle along a circle or within a ring.

15. The process according to claim 14, wherein the entry sites are offset from longitudinal axes of tubes of the tube bundle reactor, and the center of each entry site has the maximum distance from the closest longitudinal axes of the tubes.

16. The process according to 10, wherein the feed stream is divided in a plurality of feed streams, which is carried out by conducting the reactant mixture through dividing tubes, and the conducting of the reactant mixture comprises the passing of the reactant mixture through a Y division which supplies two entry sites with reactant mixture, or which supplies a further Y division with reactant mixture.

17. The process according to claim 10, which further comprises a step of releasing the product from the tube bundle, wherein the product is passed out of the tube bundle at a release end of the tube bundle at the opposite end to the feed end in the form of a fluid stream into an interior of a release hood of the tube bundle reactor, the fluid stream on exit from the release end having a cross-sectional area and the interior of the release hood through which the fluid stream flows having an internal volume; and the ratio of release hood internal volume to cross-sectional area of the fluid stream at the release end being less than 0.35 m.

* * * * *